(12) United States Patent     (10) Patent No.:   US 12,632,647 B2

Zhou                (45) Date of Patent:     May 19, 2026

(54) ARTIFICIAL INTELLIGENCE ASSISTED RECOGNITION METHOD AND DEVICE

(71) Applicants: Chunda Zhou, Chaoyang (CN); Xiangming Yin, Chaoyang (CN)

(72) Inventor: Chunda Zhou, Chaoyang (CN)

(73) Assignees: Chunda Zhou, Chaoyang (CN); Xiangming Yin, Chaoyang (CN)

( * ) Notice: Subject to any disclaimer, the term of this patent is extended or adjusted under 35 U.S.C. 154(b) by 350 days.

(21) Appl. No.: 16/959,302

(22) PCT Filed: Dec. 29, 2018

(86) PCT No.: PCT/CN2018/125731

§ 371 (c)(1),
(2) Date: Jun. 30, 2020

(87) PCT Pub. No.: WO2019/129292

PCT Pub. Date: Jul. 4, 2019

(65) Prior Publication Data

US 2022/0156457 A1     May 19, 2022

(30) Foreign Application Priority Data

Dec. 31, 2017    (CN) .......................... 201711494012.4

(51) Int. Cl.
    *G06F 17/00*       (2019.01)
    *G06F 40/20*       (2020.01)
    *G06V 30/414*     (2022.01)

(52) U.S. Cl.
    CPC ............ *G06F 40/20* (2020.01); *G06V 30/414* (2022.01)

(58) Field of Classification Search
    CPC ...... G06F 40/20; G06F 40/109; G06F 40/106; G06F 40/10; G06V 30/414
    See application file for complete search history.

(56) References Cited

U.S. PATENT DOCUMENTS

| 5,307,422 | A | 4/1994 | Wang |
| 7,062,076 | B1 * | 6/2006 | Osborne ................ G16B 25/10 |
| | | | 382/128 |

(Continued)

FOREIGN PATENT DOCUMENTS

| CN | 102103586 A | 6/2011 |
| CN | 105487684 A | 4/2016 |

(Continued)

OTHER PUBLICATIONS

Bai, Nguyen Noi, Kim Nam, and Youngjun Song. "Extracting curved text lines using the chain composition and the expanded grouping method." Document Recognition and Retrieval XV. vol. 6815. SPIE, 2008 (Year: 2008).*

(Continued)

*Primary Examiner* — Andrew T McIntosh

(74) *Attorney, Agent, or Firm* — Ziegler IP Law Group, LLC.

(57) ABSTRACT

Improving the efficiency of human or machine reading and recognizing graphics, images, text, symbols, spaces, or objects is a very important issue. For example, fast reading can help people get information quickly. The invention achieves one or more of the following objectives by means of graphics, images, text, symbols, spaces or objects arranged in different arrangements: reducing the speed, frequency, amplitude, distance of eye movement, improving the efficiency of visual recognition, achieving rapid reading, improving the utilization rate of paper and display device, reducing the use of paper, reducing the felling of trees, and protecting the environment.

21 Claims, 16 Drawing Sheets

(56)        References Cited

U.S. PATENT DOCUMENTS

| | | | | |
|---|---|---|---|---|
| 9,367,736 | B1* | 6/2016 | Senechal | G06V 30/40 |
| 9,734,132 | B1* | 8/2017 | Kothandapani Shanmugasundaram | G06F 40/103 |
| 9,916,295 | B1* | 3/2018 | Crawford | G06F 40/166 |
| 2002/0091713 | A1* | 7/2002 | Walker | G06F 40/211 |
| 2004/0196266 | A1* | 10/2004 | Matsuura | G06F 3/04883 345/169 |
| 2005/0198070 | A1* | 9/2005 | Lowry | G06F 16/316 |
| 2010/0231938 | A1* | 9/2010 | Ohguro | G06F 40/103 358/1.9 |
| 2011/0239112 | A1* | 9/2011 | Nakano | G06F 3/0237 715/261 |
| 2014/0002352 | A1* | 1/2014 | Jacob | G09G 5/00 345/156 |
| 2014/0249764 | A1* | 9/2014 | Kumar | G16B 30/00 702/20 |
| 2014/0258852 | A1* | 9/2014 | Sesum | G06F 40/263 715/256 |
| 2014/0368550 | A1* | 12/2014 | Vaske | G06T 3/40 345/661 |
| 2016/0093232 | A1* | 3/2016 | Chong | G06F 8/436 434/118 |
| 2017/0169475 | A1* | 6/2017 | Korpusik | G06Q 30/0269 |
| 2017/0200296 | A1* | 7/2017 | Jones | G06V 20/62 |
| 2017/0372003 | A1* | 12/2017 | Nishimura | G16B 20/00 |

FOREIGN PATENT DOCUMENTS

| | | |
|---|---|---|
| CN | 105677630 A | 6/2016 |
| CN | 108268430 A | 7/2018 |
| WO | 2014062841 | 4/2014 |

OTHER PUBLICATIONS

Libbrecht, Maxwell W., and William Stafford Noble. "Machine learning applications in genetics and genomics." Nature Reviews Genetics 16.6 (2015): 321-332 (Year: 2015).*

Rebeiz, Mark, and James W. Posakony. "GenePalette: a universal software tool for genome sequence visualization and analysis." Developmental biology 271.2 (2004): 431-438 (Year: 2004).*

Li, Heng, et al. "The sequence alignment/map format and SAMtools." bioinformatics 25.16 (2009): 2078-2079 (Year: 2009).*

International Search Report, Application No. PCT/CN2018/125731, mailed Mar. 27, 2019, 4 pages.

* cited by examiner

中代寓叫愚山说古一人在，北公的南两山他出一做山座王，下率的们
国有言做公﹀的代位，华名山。家面座挡家路座大，叫屋愚决领儿要
古个，﹀移。是有老住北叫愚他门有大住的，叫行一做山公心他子用
铷去座，老名蠹了，你样免矗你子要这座是不的公说死后的，死又子
头这大有头叫的发说们于太了们教挖样大亮可。回：了有儿了有，
挖两山个子智着笑是这未愚。父人掉两山全能愚答我以我子子，孙子
(a)
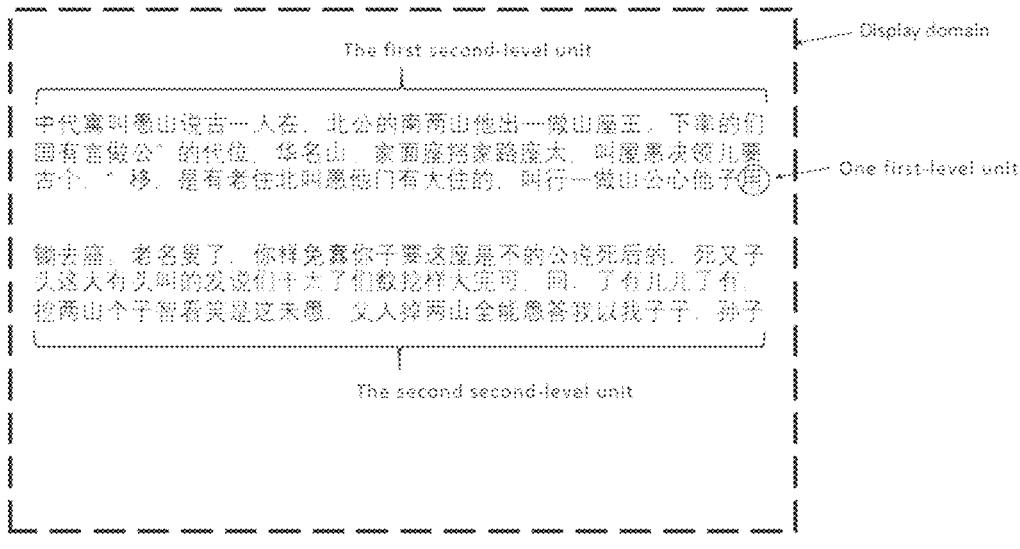
(b)
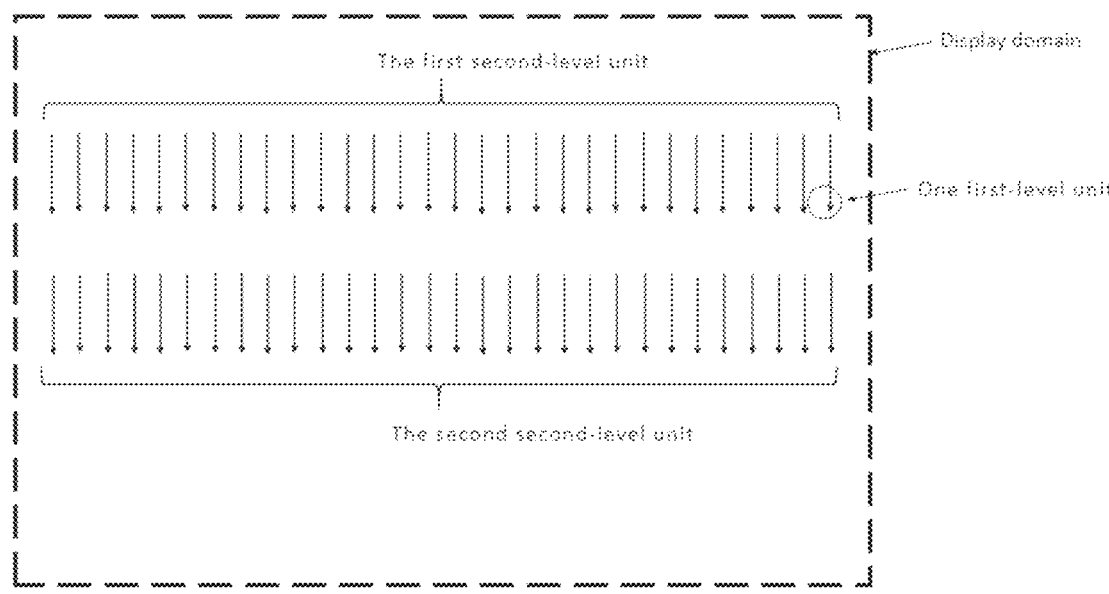
(c)
Figure 1

Figures 2, 3, 4, 5, 6:
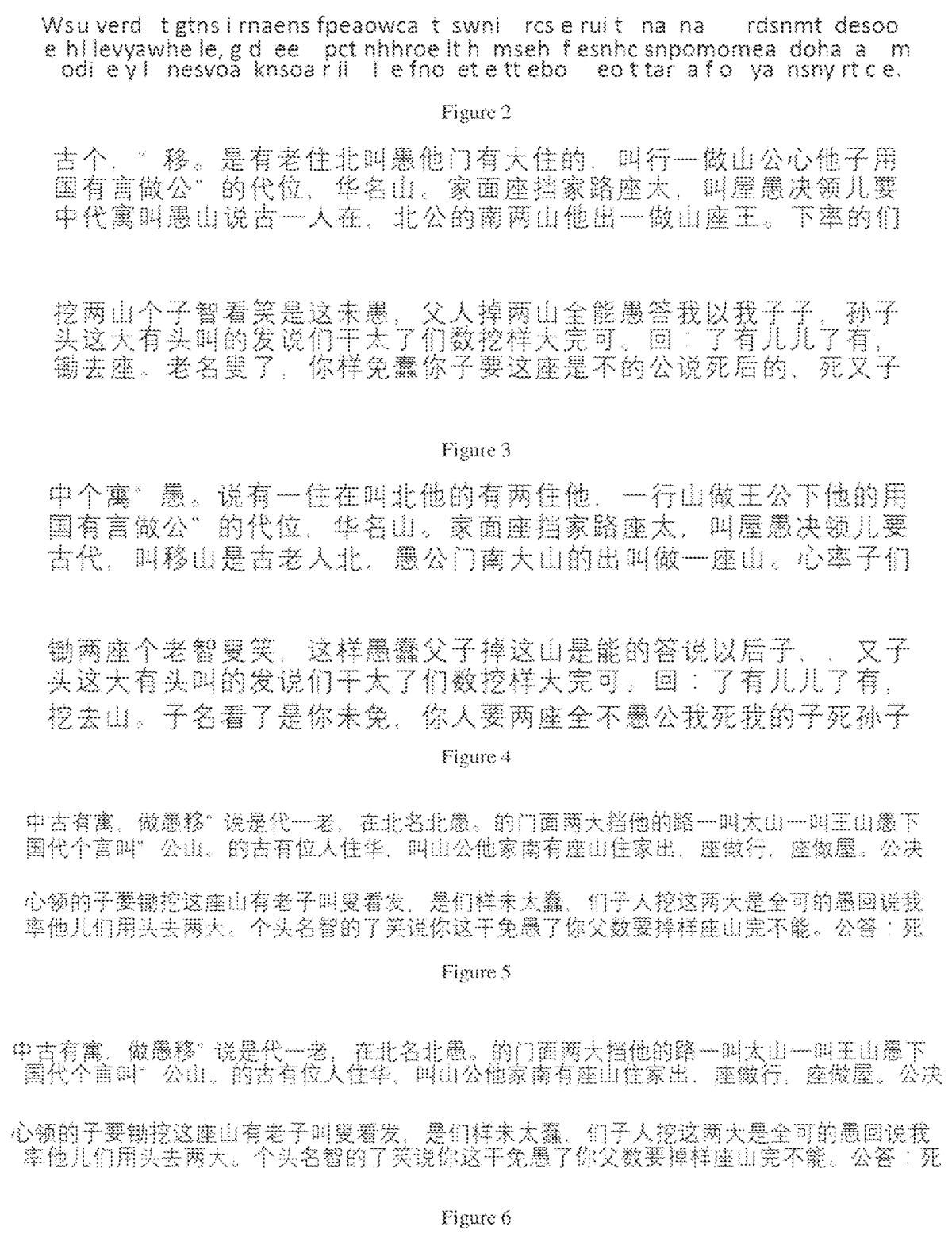

Wsu verd  t gtns i rnaens fpeaowca t  swni  rcs e rui t  na  na    rdsnmt desoo
e hl levyawhe le, g d ee   pct nhhroe lt h  mseh  f esnhc snpomomea  doha  a   m
odi e yl  nesvoa  knsoa r ii  l e fno  et e tt ebo   eo t tar a fo  ya nsny rt c e.

Figures 7, 8, 9, 10, 11, 12:
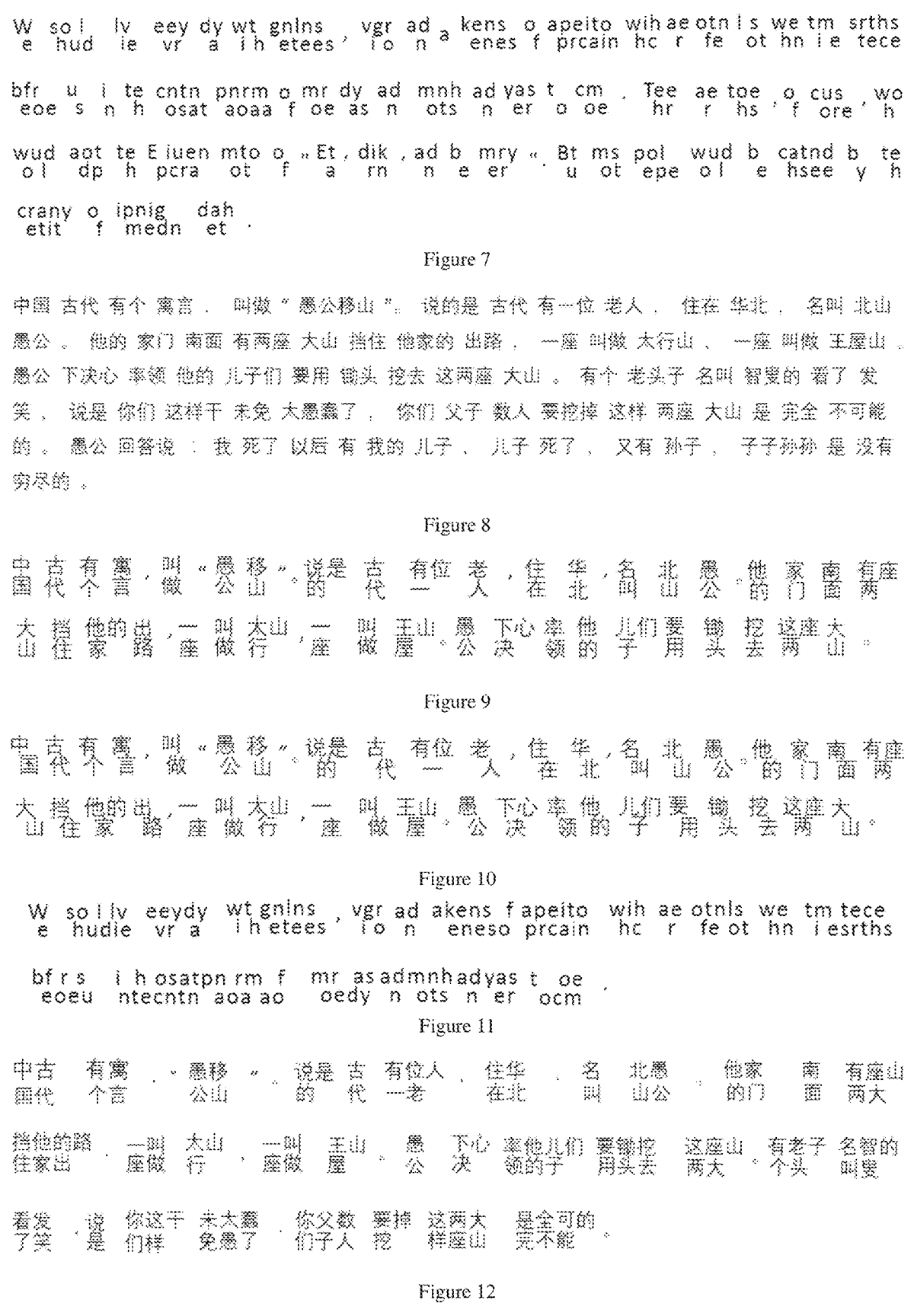

W  so l    lv   eey dy wt gnlns  ,  vgr  ad  ᵃ kens  o  apeito  wih ae otnl s  we tm  srths
 e  hud    ie   vr   a  i h etees ,  i o   n  ᵃ   enes  f  prcain  hc  r  fe   ot  hn  i e  tece bfr   u  i  te  cntn  pnrm  o  mr  dy  ad  mnh  ad yas t  cm  .  Tee  ae  toe   o  cus   wo
 eoe  s  n  h  osat  aoaa  f  oe  as  n  ots  n  er  o  oe    hr   r  hs , f  ore ,  h wud  aot  te  E iuen  mto  o  „Et , dik , ad  b  mry «  Bt  ms  pol   wud  b  catnd  b  te
 ol   dp  h  pcra  ot  f   a   rn   n   e  er    u  ot  epe  ol   e  hsee  y  h crany  o  ipnig   dah
 etit   f  medn   et .

W  so l  lv   eeydy  wt gnlns  ,  vgr  ad  akens  f apeito  wih ae  otnls  we  tm  tece
 e  hudie  vr   a  i h etees ,  i o   n   eneso  prcain  hc  r  fe ot  hn  i esrths bf r s   i  h osatpn  rm  f   mr  as admnh ad yas  t  oe  .
 eoeu   ntecntn  aoa ao   oedy  n  ots  n  er   ocm

Figures 13, 14, 15, 16, 17:
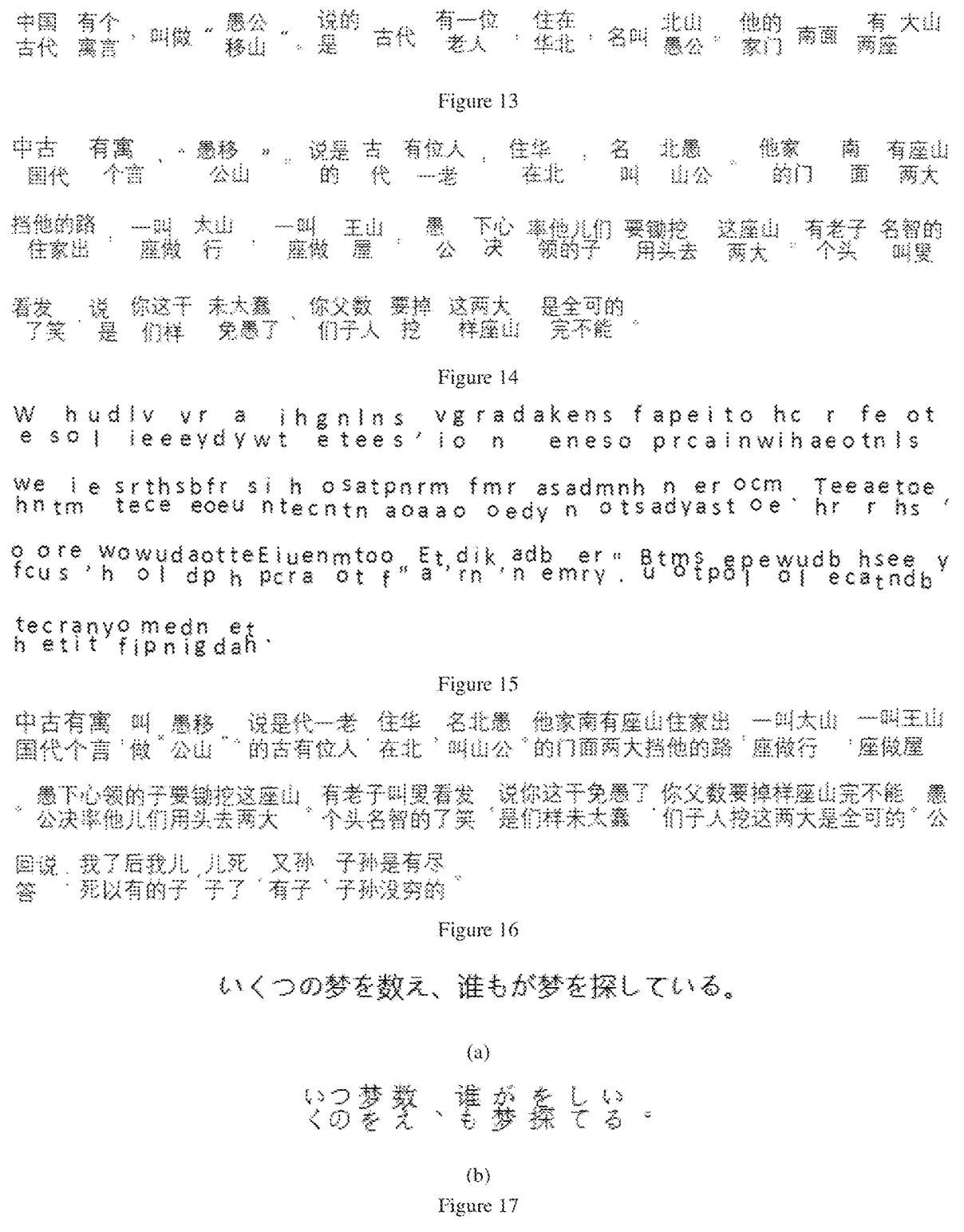

W hudlv vr a ihgnlns vgradakens fapeito hc r fe ot
e sol ieeeydywt etees' io n  eneso prcainwihaeotnls we ie srthsbfr si h osatpnrm fmr asadmnh n er ocm Teeaetoe
hn tm tece eoeu ntecntn aoaao oedy n otsadyast Oe ' hr r hs ' o ore WowudaotteEiuenmtoo Et dik adb er " Btms epewudb hsee y
fcus ' h ol dp h pcra ot f " a ' rn ' n emry . u otpo' ol ecatndb tecranyo medn et
h etit fipnigdah ·

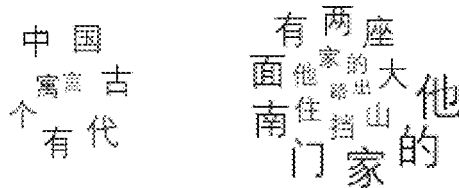
(a)
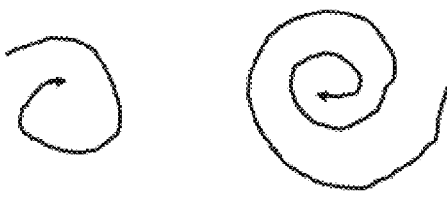
(b)
Figure 18
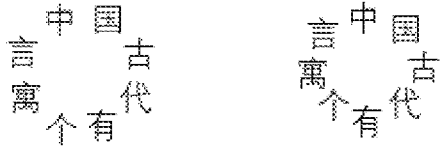
(a)
(b)
Figure 19

Das Wichtigste im Leben ist, von den Lebenserfahrungen zu lernen und am Ende
ein besserer Mensch zu werden.

(a)

| Das | im | ist | von | Lebenserfahrungen | lernen | am | ein | Mensch | |
|-----|-----|-----|-----|-----|-----|-----|-----|-----|-----|
| Wichtigste | Leben | | den | zu | | und | Ende besserer | zu | werden. |

Mais, si tu m'apprivoises, ma vie sera comme ensoleillée.

(a)

Mais, si tu m'apprivoises , ma vie sera comme ensoleillée.

Figures 25, 26, 27:
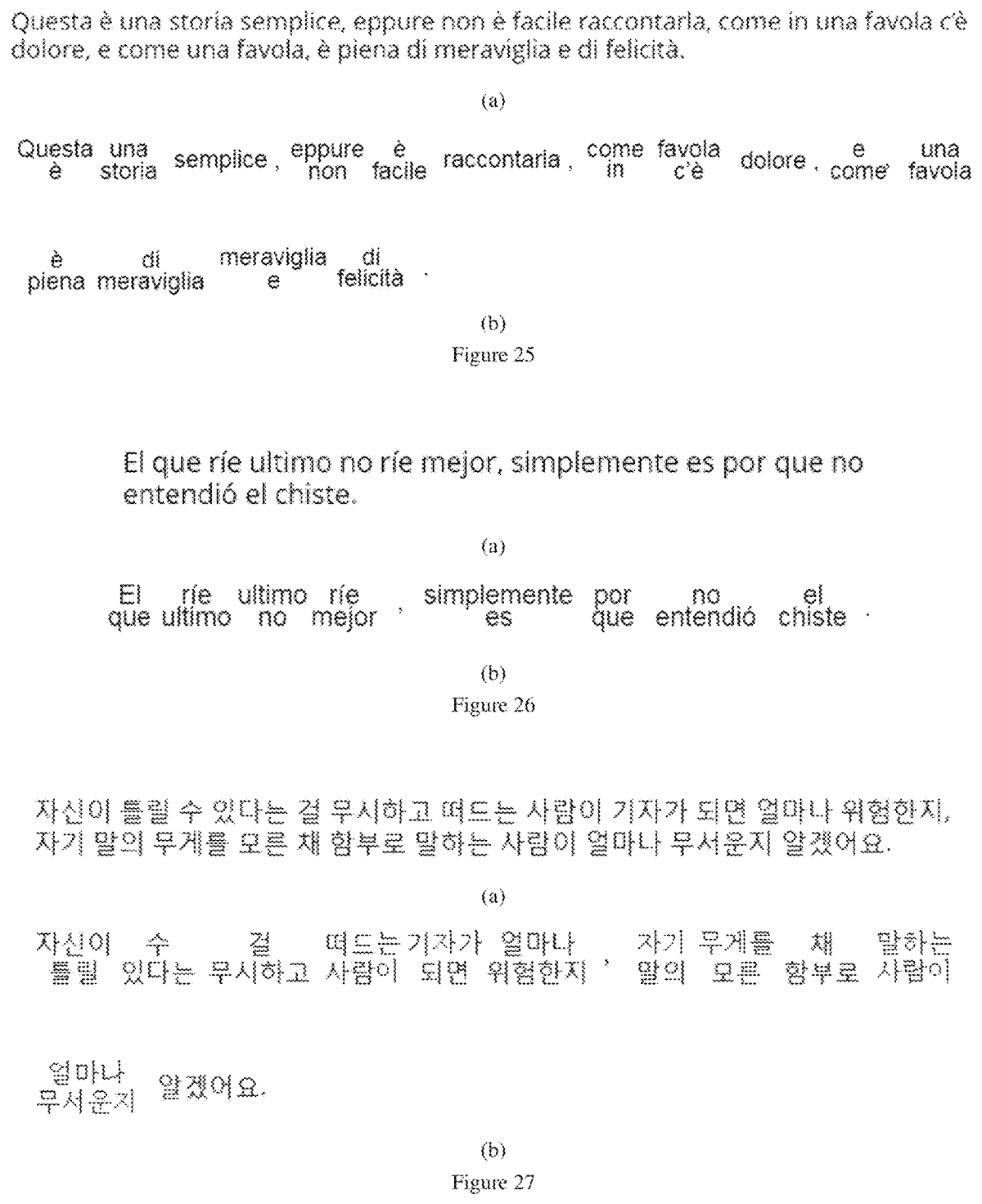

Questa è una storia semplice, eppure non è facile raccontarla, come in una favola c'è dolore, e come una favola, è piena di meraviglia e di felicità.

(a)

Questa una semplice , eppure è raccontarla , come favola dolore , e una
è storia non facile in c'è come favola è di meraviglia di
piena meraviglia e felicità ·

El que ríe ultimo no ríe mejor, simplemente es por que no entendió el chiste.

(a)

El ríe ultimo ríe , simplemente por no el
que ultimo no mejor es que entendió chiste ·

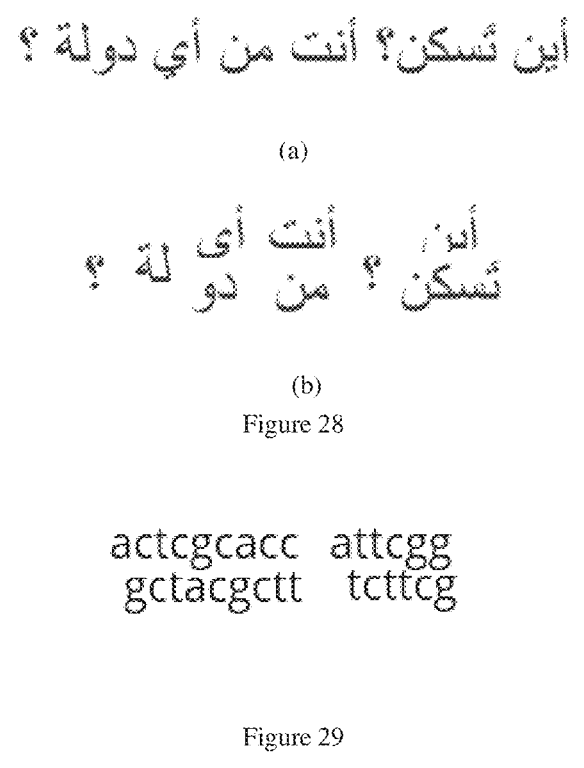

Figure 28 actcgcacc attcgg
gctacgctt tcttcg

Figure 29

```
import java.util.Scanner;
class Bissextile {
    public static void main(String[] args){
        System.out.print("      请输入年份");
    int year;        // 定义输入的年份名字为"year"
    Scanner scanner = new Scanner(System.in);
    year = scanner.nextInt();
    if (year<0||year>3000){
        System.out.println("      年份有误，程序退出！");
        System.exit(0);
        }
    if ((year%4==0)&&(year%100!=0)||(year%400==0))
        System.out.println(year+" is bissextile");
    else
        System.out.println(year+" is not bissextile ");
    }
}
```

(a)

```
import java.util.Scanner;

class Bissextile { public static void main ( String [] args ) {

System . out . Print ("     请输入年份  ");

int year; // 定义输入的年份名字为 "year"

Scanner scanner = new Scanner (System.in);

year = scanner . nextInt ();

If(year<0||year>3000){

System . out . println ("     年份有误，程序退出！");

System . exit(0);

}

If(year%4==0)&&(year%100!==0)||(year%400==0)

System .out . println ("year+" is bissextile") ;

else

System .out . println ("year+" is not bissextile") ;

We should live ev<sub>er</sub>y day with gen<sub>tle</sub>ness , vig<sub>or</sub> and a keen<sub>ness</sub> of ap<sub>pre</sub>ci<sub>a</sub>tion which are of<sub>ten</sub> lost when time stre<sub>tches</sub> be<sub>fore</sub> us in the con<sub>stant</sub> pan<sub>o</sub>ra<sub>ma</sub> of more days and months and years to come . There are those , of course , who would adopt the Ep<sub>i</sub>cu<sub>re</sub>an mot<sub>to</sub> of " Eat, drink, and be mer<sub>ry</sub> " . But most peo<sub>ple</sub> would be chas<sub>ten</sub>ed by the cer<sub>tain</sub>ty of im<sub>pend</sub>ing death.

Figure 31

We should<sub>live</sub> every<sub>day</sub> with<sub>gentleness</sub> , vigor and a<sub>keenness</sub> of<sub>appreciation</sub> which are often<sub>lost</sub> when time<sub>stretches</sub> before<sub>us</sub> in the constant of more<sub>days</sub> and<sub>months</sub> and<sub>years</sub> to<sub>come</sub> .

Figure 32

We should<sub>live</sub> every<sub>day</sub> with<sub>gentleness</sub>, vigor and a<sub>keenness</sub> of<sub>appreciation</sub> which are often<sub>lost</sub> when time<sub>stretches</sub> before<sub>us</sub> in constant of<sub>the panorama</sub> more<sub>days</sub> and<sub>months</sub> and<sub>years</sub> to<sub>come</sub> .

Figure 33

中国<sub>古代</sub> 有个<sub>寓言</sub> ，叫做 " 愚公<sub>移山</sub> " 。说是<sub>的</sub> 古代 有一位<sub>老人</sub> ，住在<sub>华北</sub> ，名叫 北山<sub>愚公</sub>。他的<sub>家门</sub> 南面 有<sub>两座</sub>大山

挡住<sub>他家的</sub> 出路 。一座<sub>叫做</sub> 太行山 ，一座<sub>叫做</sub> 王屋山 。愚公 下决心 率领<sub>他的</sub> 儿子们 要用 挖去<sub>锄头</sub> 这两座<sub>大山</sub> 。

有个<sub>老头子</sub> 名叫<sub>智叟的</sub> 看了<sub>发笑</sub> ，说是 你们<sub>这样干</sub> 未免<sub>太愚蠢了</sub> ，你们<sub>父子</sub> 数人 要挖掉 这样<sub>两座</sub> 大山 是完全<sub>不可能的</sub> ，

We　every day　vigor　a keenness of appreciation　are　when
should live  with gentleness  ，  and　which　often lost  time stretches before us　more days and months and years
in the constant panorama of　to come　。

Figure 36

We　every day　vigor　a keenness of appreciation  are　when
should live  with gentleness  ，  and　which　often lost　time stretches before us　more days and months and years
in the constant panorama of　to come

Figure 37

We  /  every day　vigor  a keenness of appreciation  are　when
should live  /  with gentleness，  and　which　often lost　time stretches before us　more days and months and years
in the constant panorama of　to come　。

There are those,  who would adopt the Epicurean motto of    But most people would be chastened
 of course,     "Eat, drink, and be merry"     by the certainty of impending death.

We should every day with gentleness, vigor and a keenness of appreciation which are oftenst when time stretches before us in the constant panorama of more days and months and years to come. There are those, of course, who would adopt the Epicurean motto of "Eat, drink, and be merry". But most people would be chastened by the certainty of impending death.

ARTIFICIAL INTELLIGENCE ASSISTED RECOGNITION METHOD AND DEVICE

TECHNICAL FIELDS

The technical fields involved in the invention include: publishing, typography, printing, digital display, education, genetic testing, artificial intelligence, and natural language processing.

BACKGROUND OF THE INVENTION

According to eye dynamics and other studies related to the reading or recognition of graphics, images, text, symbols, spaces, or objects by humans, many people believe that there are some conclusions: adults generally have 10 to 15 percent of the time is read-back check. Reading for long periods of time can cause fatigue in the movement of the eyeballs. In the traditional way of arranging and typography, it is easy to produce the phenomenon of "wrong line". When reading, the perspective of the two eyes does not always keep the same. Most traditional techniques are to arrange graphics, images, text, symbols, spaces, or objects in a lateral-first-and-then-longitudinal manner. That is, a lateral row is formed first. A longitudinal column is then formed (the arrangement in this article is called the "traditional arrangement"). This traditional approach has lasted for thousands of years in human history and is an important carrier of civilization and a great driving force for its development. In specific areas, such as analysis and manual examination of the results of gene sequencing, the results are often expressed in a, t, c, g, etc., and then arranged in a lateral-first-and-then-longitudinal manner. That is, lateral rows (traditional arrangements) are formed first. A longitudinal column is then formed for the reader to read and view. Many of these problems also exist in machine vision, such as when using image sensors to get graphics, images, text, symbols, spaces, or objects.

Content of Invention

Improving the efficiency of human or machine reading and recognizing graphics, images, text, symbols, spaces, or objects is a very important issue. For example, fast reading can help people get information quickly.

The invention achieves one or more of the following objectives by means of graphics, images, text, symbols, spaces or objects arranged in different arrangements: reducing the speed, frequency, amplitude, distance of eye movement, improving the efficiency of visual recognition, achieving rapid reading, improving the utilization rate of paper and display device, reducing the use of paper, reducing the felling of trees, and protecting the environment.

Some academic opinions hold that when adults read the contents of graphics, images, text, symbols, spaces, or objects in the traditional way, such as reading materials such as graphics, images, text, symbols, spaces, or objects arranged laterally, the eye's gaze points moves at different speed and stays for different time interval according to the content of graphics, images, text, symbols, spaces or objects, grammatical structure, difficulty of words, the reader's cognitive level, context, etc. Some academic views suggest that the shape of the human eye's field of view is roughly an approximately elliptical distribution with a slightly wider in lateral direction and a slightly narrower in longitudinal direction. Early televisions or monitors improved from a width-to-height ratio of nearly 4:3 to a nearly 16:9 or 16:10 one at this stage, largely because it better adapted and took full advantage of the human field of view.

There are some defects and/or problems in the traditional arrangements:

When read a traditional arrangement, a typical "gaze" gets a lot contents in the field of view of eyes. The content may contain content in other lines next to the target's line, in addition to the content of the target's line.

Some academic opinions suggest that, in many cases, reading and understanding includes the processing of "sense groups". For example, in English, when "The People's Republic of China" appears in one sentence, it can be thought of as a sense group. The " 我和我的同学 " part in a Chinese's sentence: " 放学后，我和我的同学去 打篮球。" can also be seen as a sense group. Some academics argue that, ideally, one can quickly read by "gazing" at once to deal with a sense group. However, in the traditional arrangement, a part of a sense group is likely to exceed the field of view of the human eye, so sometimes one has to "gaze" multiple times or scan to identify a sense group, which reduces the efficiency of reading, and may potentially increase the error rate. For longer words, such as the long word "internationalization" in English, because its laterally too long, it may also be partially out of range of field of view of eyes and not fully recognized in one "gaze". As a result, sometimes one has to identify a word through multiple "gazes" or scans, which can reduce the efficiency of reading and potentially increase the rate of errors, and the movement of such gaze points can also lead to eye muscle fatigue.

In text that is traditionally arranged, during reading, the gaze point moves to the end of one line and then needs to go back to the beginning of the next line to continue reading. This long-distance movement is prone to errors—that is, "wrong line".

When a traditional arrangement displays graphics, images, text, symbols, spaces, or objects on some paper or display device, for example, the lateral line arrangement may cause the length of each line of the traditional arrangement to be short because the lateral direction of the paper or display device is not long enough, thus affecting the reader's reading consistency and frequent line changes can affect efficiency and fatigue. In another case, the shape of the paper or display device is not rectangular but other shapes, which creates a great challenge to the display in the traditional typography way, and at some point, it is likely to be not wide enough, thus affecting the reader's reading consistency. And frequent line changes can also affect efficiency. Some academic opinions hold that the human brain can acquire visual information such as graphics, images, text, symbols, spaces or objects faster than the general reading and language communication of information. Therefore, the traditional way of reading and language communication may be the bottleneck of the human brain to obtain graphics, images, text, symbols, spaces or object information, restricting the efficiency of the human brain to obtain graphics, images, text, symbols, spaces or object information.

BRIEF DESCRIPTION OF THE DRAWINGS

The present invention is further described in detail below in conjunction with the drawings schedule and specific embodiment:

FIG. 1 is a diagram of an embodiment;

FIG. 2 is a diagram of an embodiment;

FIG. 3 is a diagram of an embodiment;

FIG. 4 is a diagram of the embodiment;

FIG. 5 is a diagram of the embodiment;

FIG. 6 is a diagram of the embodiment;
FIG. 7 is a diagram of an embodiment;
FIG. 8 is a diagram of an embodiment;
FIG. 9 is a diagram of an embodiment;
FIG. 10 is a diagram of an embodiment;
FIG. 11 is a diagram of an embodiment;
FIG. 12 is a diagram of an embodiment;
FIG. 13 is a diagram of an embodiment;
FIG. 14 is a diagram of an embodiment;
FIG. 15 is a diagram of an embodiment;
FIG. 16 is a diagram of an embodiment;
FIG. 17 is a diagram of an embodiment;
FIG. 18 is a diagram of an embodiment;
FIG. 19 is a diagram of an embodiment;
FIG. 20 is a diagram of an embodiment;
FIG. 21 is a diagram of an embodiment;
FIG. 22 is a diagram of an embodiment;
FIG. 23 is a diagram of the embodiment;
FIG. 24 is a diagram of an embodiment;
FIG. 25 is a diagram of an embodiment;
FIG. 26 is a diagram of an embodiment;
FIG. 27 is a diagram of an embodiment;
FIG. 28 is a diagram of an embodiment;
FIG. 29 is a diagram of an embodiment;
FIG. 30 is a diagram of an embodiment;
FIG. 31 is a diagram of an embodiment;
FIG. 32 is a diagram of an embodiment;
FIG. 33 is a diagram of an embodiment;
FIG. 34 is a diagram of the embodiment;
FIG. 35 is a diagram of an embodiment;
FIG. 36 is a diagram of an embodiment;
FIG. 37 is a diagram of an embodiment;
FIG. 38 is a diagram of an embodiment;
FIG. 39 is a diagram of an embodiment;
FIG. 40 is a diagram of an embodiment;
FIG. 41 is a diagram of an embodiment;

DETAILED DESCRIPTION OF THE PREFERRED EMBODIMENT

For one or more of the above problems, the present invention uses the characteristics of the visual system (such as the human eye) more effectively by changing the arrangement of graphics, images, text, symbols, spaces or objects, and improves the reading efficiency of graphics, images, text, symbols, spaces or objects.

In some embodiment, optionally, one or more graphics, images, text, symbols, spaces, or objects or their combinations or groups or other ranges form one first-level unit.

Arrange the above-mentioned first-level units in a specific pattern. A first-level units are arranged individually or in a single-level unit to form a second-level unit.

Optionally, the above arrangement mode allows the second-level unit or part of the second-level unit to be as close as possible to an area that can be fully identified by a "gaze".

In some embodiment, optionally, first-level unit can be arranged in a nonlinear manner. In some embodiment, optionally, the second-level unit contains multiple first-level units arranged along multiple curves or straight lines. In some embodiment, optionally, the first-level units are arranged from top to bottom and/or bottom-to-top along multiple curves or straight lines (FIGS. 1, 3, 4). In some embodiment, optionally, the first-level units are arranged laterally first along multiple curves or straight lines, and then longitudinally. In some embodiment, it may be optional that all or part of the multiple curves or lines first-level unit arranged along different curves or lines is not aligned with the first-level unit arranged along adjacent curve among the same multiple curves or straight lines.

Table 1 shows some of the possible technical solutions that can be formed when a first- and second-level unit selects different content:

| Second-level unit | First-level unit | | | | | | |
|---|---|---|---|---|---|---|---|
| | Character/ letter/ hiraganas/ katakanas | Syllables | Tone | Phases/ phrases/ sense groups | Parts formed by punctuation segmentation | Sentences | First-units formed by other ways of division |
| Syllables | 11 | | | | | | 17 |
| Words | 21 | 22 | | | | | 27 |
| Phrases/phrases/ sense groups | 31 | 32 | 33 | | | | 37 |
| Parts formed by punctuation segmentation | 41 | 42 | 43 | 44 | | | 47 |
| Sentences | 51 | 52 | 53 | 54 | 55 | | 57 |
| Region formed by the limitations of the display domain | 61 | 62 | 63 | 64 | 65 | 66 | 67 |
| Second-units formed by other ways of division | 71 | 72 | 73 | 74 | 75 | 76 | 77 |

Figure 44:
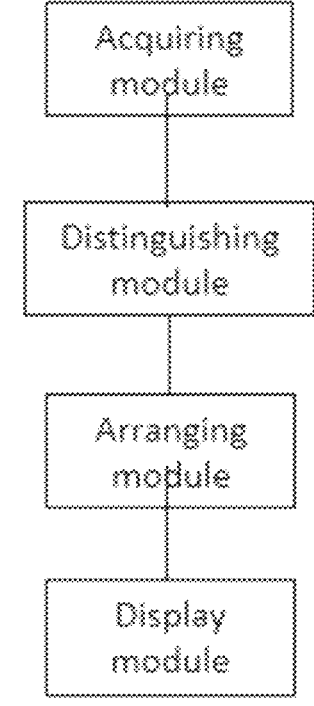
Figure 45:
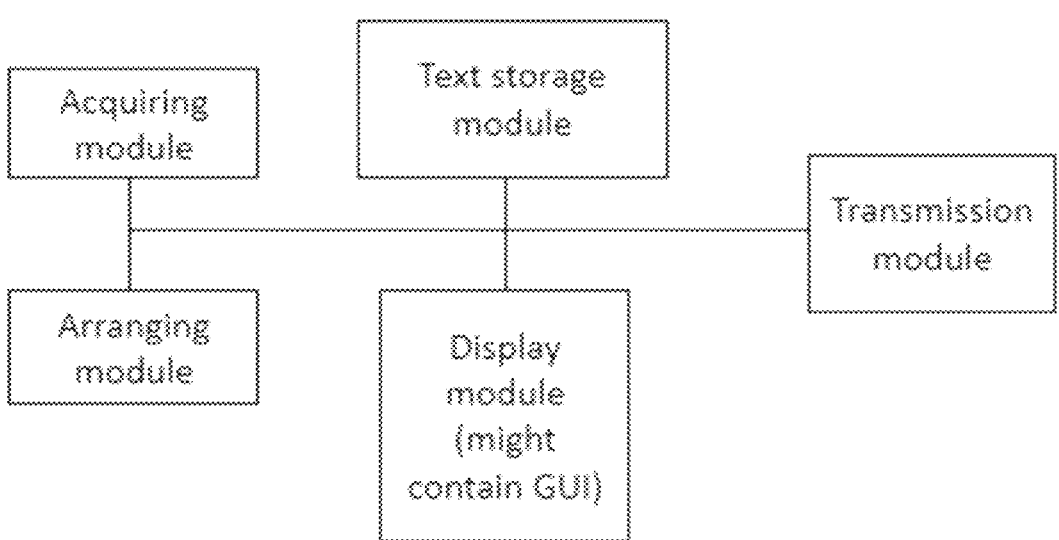
Figure 46:
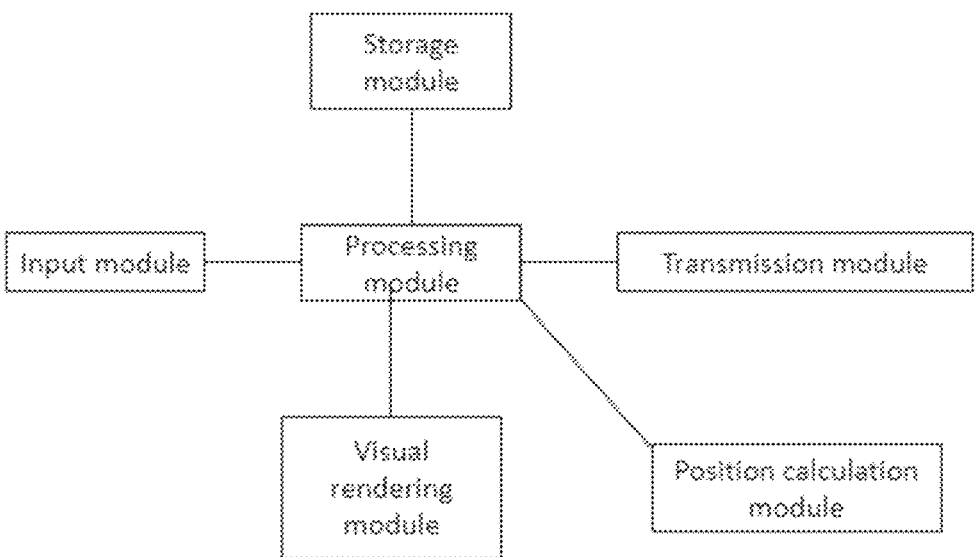
Figure 47:
Figure 48:
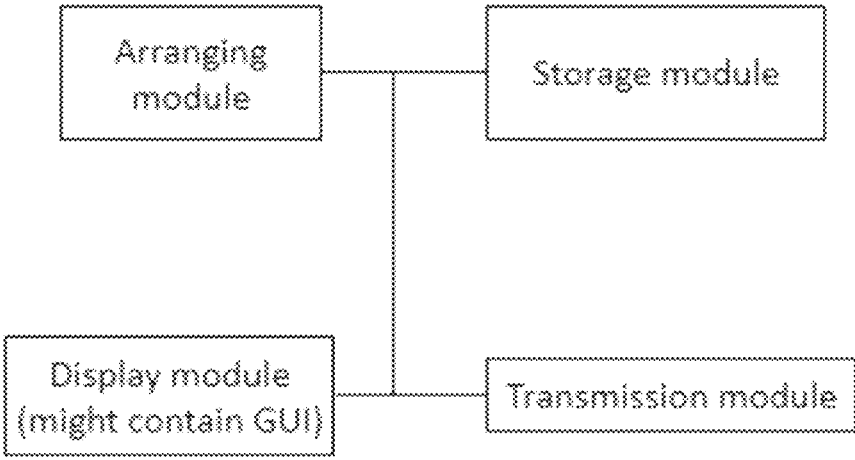

FIG. 42 is a diagram of an embodiment;
FIG. 43 is a diagram of an embodiment;
FIG. 44 is a diagram of an embodiment;
FIG. 45 is a diagram of an embodiment;
FIG. 46 is a diagram of an embodiment;
FIG. 47 is a diagram of an embodiment;
FIG. 48 is a diagram of an embodiment;

Table 1 shows all or part of the possible technical schemes formed when the first and second-level units select different contents.

1. A method of arranging graphics, images, text, symbols, spaces or objects comprising: a first-level unit and a second-level unit comprising the first-level unit; the first-level unit comprising at least one of following units or a combination thereon: graphics, images, letters, characters, Japanese hiraganas, Japanese katakanas, syllables, words, phrases, phrases, sense groups, parts formed by punctuation segmentation, sentences, punctuation marks, spaces, sentence components, genes in gene sequences, gene fragments in gene sequences, variable names, key words, symbols, statements on individual lines, parts enclosed in parentheses, classes, methods; the said second-level unit comprising one or more of the following structures or a combination thereon: graphics, images, letters, words, Japanese hiraganas, Japanese katakanas, syllables, words, phrases, phrases, sense groups, parts formed by punctuation segmentation, sentences, punctuation marks, spaces, sentence components, genes in gene sequences, gene fragments in gene sequences, variable names, keywords, symbols, statements on individual lines, parts enclosed in parentheses, classes, methods; specifying freely the first-level unit and the second-level unit within a specified range.

2. The method of item 1, wherein the second-level unit contains a sing number of the first-level unit.

3. The method of item 1, wherein the arrangement of the first-level unit or second-level unit is along curves or straight lines.

4. The method of item 3, wherein the arrangement way is from top to bottom and/or from bottom to top.

5. The method of item 3, wherein the arrangement orientation is lateral and/or longitudinal.

6. The method of item 3, wherein the arrangement is in the longitudinal direction first and then in the lateral direction.

7. The method of item 3, wherein the arrangement is in the lateral direction first and then in the longitudinal direction.

8. The method of item 3, wherein the arrangement orientation is first formed from top left to bottom right and then arranged laterally in different ways from top left to bottom right.

9. The method of item 3, wherein the arrangement orientation is arranged only in the longitudinal or in the lateral direction.

10. The method of item 3, wherein the arrangement orientation is arranged in any direction.

11. The method of item 3, wherein the number of curves or straight lines is plural.

12. The method of item 11, wherein the number of plural curves or straight lines is 3.

13. The method of item 11, wherein the number of plural curves or straight lines is 2.

14. The method of item 11, wherein the plural straight lines are partially or totally parallel to each other.

15. The method of item 11, wherein the plural curves are partially or totally parallel to each other.

16. The method of item 11, wherein the second-level unit continues to arrange along another curve or straight line as it arranges along the straight line or curve to or near the edge of the display domain.

17. The method of item 11, wherein the units belonging to different units are separated by arranging interval marks between the second-level units.

18. The method of item 11, wherein the first-level units arranged on different curves or straight line among the multiple straight lines or curves is not aligned with the other first-level units along adjacent curves or straight line.

19. The method of item 3, wherein the plural first and/or second-level units arranged in the manner described are separated by text and/or characters and/or punctuation and/or spaces.

20. The method of item 3, wherein the curve is spiral on the whole.

21. The method of item 3, wherein the curve is elliptical as a whole.

22. The method of item 3, wherein the specific arrangement is as follows: for the contents of the second-level unit of the target, in accordance with the original order of the text arranged in a straight line, numbering the first-level units from 1 to n, where n is the total number of text symbol and/or characters and/or punctuation and/or spaces in the second-level unit; estimating the total number of arrangement lines or curves is k, mark all of the lines and curves from 1, 2, 3 . . . k, called a row number; arranging the first-level units in order on the curve or straight line in order from 1 to k; rearranging the first-level units in order from 1 to k on the curve or straight line until all arranged.

23. The method of item 22, wherein the order of each first-level unit arranged on the curve or line does not violate its original order in the traditional arrangement.

24. The method of item 1, wherein the number of first-level units and/or second-levels is plural.

25. The method of item 24, wherein when the longitudinal height of some of the second-level units in the present is different from the longitudinal height of other second-level units, the center of each second-level unit in the same lateral direction is aligned to the same lateral line.

26. The method of item 1, wherein the arrangement orientation is curve.

27. The method of item 1, wherein the arrangement is dynamic.

28. The method of item 1, wherein the punctuation marks are arranged with the text to which they are attached and/or adjacent, and the arrangement of punctuation marks follows the rules of the arrangement of the text to which they are attached and/or adjacent.

29. The method of item 1, wherein interval marks are arranged between the plural first units/or the plural second-level units.

30. The method of item 29, wherein the interval mark comprises spatial interval, symbol, letter and number.

31. The method of item 29, wherein when there are interval marks between multiple said first-level units and there are interval marks between multiple said second-level units, the interval marks between second-level units are greater than the interval marks between the first-level units.

32. The method of item 1, wherein the second-level unit comprises each punctuation mark or each group of punctuation marks that gathered together.

33. The method of item 1, wherein according to the location on the curves or straight lines or the content of the second-level unit, such as characters, letters, syllables, words, phrases, phrases, sense groups, the contents of the second-level units have different font sizes, fonts, patterns, orientations, colors, blurriness and other appearance differences.

34. The method of item 1, wherein the font size decreases gradually along the distribution direction within the second-level unit.

35. The method of item 1, wherein the specified range is each row or column in the poem.

36. The method of item 1, wherein the specified range is the sequence of a gene.

37. The method of item 1, wherein for languages such as Korean, the first-level module contains parts with single word and the auxiliary word of it written together, in addition to a single word.

38. The method of item 1, wherein the method of dividing the first or second-level unit is completed by an algorithm in natural language processing.

39. The method of item 1, wherein the selection of the region of second-level units is based on the shape of the display domain.

40. A device display the result of the method of any item from 1 to 39; the device can be a display device, such as a monitor, or a printed material, such as books, newspapers, and single-page printed materials.

41. A method of converting the traditional arrangement into the non-traditional arrangement in this invention, it consists of the following steps: 101) distinguishing the first-level units of the target text, and then arrange the first-level units to form second-level units in the non-traditional arrangements mentioned above, and then render them in the display domain.

42. The method of item 41, wherein if the system used does not store the target text in advance, it also comprises step obtaining the target text prior to step 101).

43. The method of item 41, wherein a content recognition step is specially comprised if the target text is in a non-text encoding form.

44. The method of item 41, wherein if the content is in the form of graphics or audio, it comprises image recognition or speech recognition.

45. The method of item 44, wherein the recognition of the image is identifying only the contours and edges of the first-level unit and not the encoding in the first-level unit.

46. The method of item 45, wherein the optional process apply parts formed by separating level one unit of target text, such as image enhancement, grayscale adjustment and so on.

47. The method of item 45, wherein apply transition operation to inconsistent background patterns and/or brightness and/or colors at seams between flattened plural units, such as apply gradient effect operation.

48. The method of item 45, wherein divide the result first-level units of recognizing the text encoding to rearrange and present them.

49. The method of item 48, wherein the visual effect is characterized by the fact that the visual effects presented are displayed through the text encoding in each unit at the first level, through the font and display techniques encoded by the text in the system.

50. The method of item 49, wherein present the final rendering result, based on the system's font, font size and other information and the characteristics of the module.

51. The method of item 43, wherein divide the first-level units contained in the content and recognize the contents contained thereon.

52. The method of item 51, wherein the said image recognition contains both the contour and edge of the recognition of the first-level unit and the recognition of the coding of the first-level units.

53. The method of item 52, wherein stitching and presenting the images of the first-level units in the original image by dividing the first-level units in the recognized text encoding.

54. The method of item 53, wherein the optionally processing of parts of the first-level units of the separated target text, such as image enhancement and grayscale adjustment.

55. The method of item 53, wherein apply transition operation to inconsistent background patterns and/or brightness and/or colors at seams between flattened plural units, such as apply gradient effect operation.

56. The method of item 41, wherein the designation of specific parameters is arranged in accordance with the non-traditional arrangement of the scheme contained in the present invention, and arranged according to the above parameters.

57. The method of item 56, wherein the parameters contain line spacing, font and font size.

58. The method of item 56, wherein calculate the coordinates and sizes of the first units waiting to be arranged by the parameters described above.

59. The method of item 56, wherein the parameters mentioned above are stored in the data structure.

60. The method of item 41, wherein the distinguishing target text in step 101) is based on the format of the target text, such as treat each character as each first-level unit.

61. The method of item 41, wherein the distinguishing target text in step 101) can be achieved through the content of the target text.

62. The method of item 41, wherein the realization of the words, phrases, sense groups and phrases in the language is done by a computer.

63. The method of item 62, wherein the process of recognition is implemented using the relating algorithms in "natural language processing" in the field of artificial intelligence.

64. The method of item 41, wherein it also includes a display step to present the final result when the processing of the method runs on the device on which the result was eventually rendered.

65. A device or system converting the traditional arrangement into a non-traditional arrangement, comprising: distinguish modules, distinguishing between the first-level units in the target text; arrangement modules, turning the first-level units into second-level units.

66. The device or system of item 65, wherein if the system used does not store the target text in advance, it contains an acquiring module to get the target text first.

67. The device or system of item 65, wherein if the target text exists in a non-text encoding form, the said distinguishing module can recognize the content contained in the target text.

68. The device or system of item 67, wherein if the said content is in the form of graphics or audio, then it contains image recognition and voice recognition functions.

69. The device or system of item 68, wherein the image is recognized as identifying only the contours and edges of the first-level unit and does not require the identification of the encoding in the first-level unit.

70. The device or system of item 69, wherein process parts formed by separating level one unit of target text, such as image enhancement, grayscale adjustment, and so on.

71. The device or system of item 69, wherein a transition of inconsistent background patterns and/or brightness and/or colors at the seams is arranged between the flattened plural first-level units, such as by gradient.

72. The device or system of item 67, wherein first-level units are rearranged and rendered by dividing the first-level units in the recognized text code.

73. The device or system of item 72, wherein rearranging and presenting of the first-level units using the font of the text code in the system and the display technology based on the text code of the first-level units.

74. The device or system of item 73, wherein produce the final rendering effect, based on the system's font, font size and other information and the characteristics of the module displaying text, keeping it flexible and diverse.

75. The device or system of item 67, wherein divide the first-level units in the text and recognize the content.

76. The method of item 75, wherein the said image recognition contains both the contour and edge of the recognition of the first-level unit and the recognition of the coding of the first-level units.

77. The device or system of item 76, wherein first-level units are stitched and rendered by dividing the first-level units in the recognized text code.

78. The device or system of item 77, wherein the optional process, apply parts formed by separating level one unit of target text, such as image enhancement, grayscale adjustment.

79. The device or system of item 77, wherein apply transition operation to inconsistent background patterns and/or brightness and/or colors at seams between flattened plural units, such as apply gradient effect operation.

80. The device or system of item 65, wherein the designation of specific parameters is arranged in accordance with the non-traditional arrangement of the scheme contained in the present invention, and arranged according to the above parameters.

81. The device or system of item 80, wherein the parameters contain line spacing, font and font size.

82. The device or system of item 80, wherein calculate the coordinates and sizes of the first units waiting to be arranged by the parameters described above.

83. The device or system of item 80, wherein the parameters mentioned above are stored in the data structure.

84. The device or system of item 65, wherein the distinguishing target text in step is based on the format of the target text, such as treat each character as each first-level unit.

85. The device or system of item 65, wherein the distinguishing target text can be achieved through the content of the target text.

86. The device or system of item 85, wherein the realization of the words, phrases, sense groups and phrases in the language is done by a computer.

87. The device or system of item 86, wherein the process of recognition is implemented using the relating algorithms in"natural language processing" in the field of artificial intelligence.

88. The device or system of item 65, wherein it also includes a display module to present the final result when the processing of the method runs on the device on which the result was eventually rendered.

89. The method of using a computer to achieve the non-traditional arrangement of the present invention further comprising the following steps: 201) arrangement steps turning the first-level unit into the second-level unit.

90. The method of item 89, wherein if the system used does not store the target text in advance, it also contains steps to obtain the target text prior to step 201).

91. The method of item 90, wherein the target text is stored in a text storage.

92. The method of item 89, wherein when the processing process of this method runs on the device that eventually renders the result, it also includes a display step 202) to present the final result.

93. The method of item 92, wherein rearranging and presenting of the first-level units in the identified text code.

94. The method of item 92, wherein the display step 202) is implemented by means of a graphical user interface, which contains a module for displaying symbols, graphics, modules of images, which is used to display the target text in the manner described in the present invention.

95. The method of item 89, wherein the designation of specific parameters is arranged in accordance with the non-traditional arrangement of the scheme contained in the present invention, then arranging according to the above parameters.

96. The method of item 95, wherein the parameters contain line spacing, font, and font size.

97. The method of item 95, wherein calculate the coordinates and sizes of the first units to be arranged by the parameters described above.

98. The method of item 95, wherein the above parameters are stored in the data structure.

99. The method of item 89, wherein if the said functions are not fully implemented by the same device, for example, they are achieved through communication between multiple devices it also includes step 203).

100. The method of item 99, wherein the code of the content of the web page is issued by the server through the transmission steps described; and is visualized and displayed by software and hardware of the client side, such as browser.

101. A device or system that implements the non-traditional arrangement of the present invention, includes an arrangement module, forming first-level units into second-level units.

102. The device or system of item 101, wherein if the system used does not store the target text in advance, it also includes a acquiring module that acquires that part of the target text before arranging it.

103. The device or system of item 102, wherein it also contains a text storage module, and the obtained target text is stored in the text storage module.

104. The device or system of item 101, wherein when the processing of the method runs on the device on which the result was eventually rendered, it comprises display module, and the final result is presented by the display module.

105. The device or system of item 104, wherein the visual effect presented by the display module is displayed through the text encoding in each unit at the first level, through the font and display technology encoded by the text in the system.

106. The device or system of item 104, wherein the display is achieved through a graphical user interface, which contains a module for displaying symbols, graphics and images, which is used to display the target text in the manner described in the present invention.

107. The device or system of item 101, wherein the designation of specific parameters is arranged in accordance with the non-traditional arrangement of the scheme contained in the present invention, and arranged according to the above parameters.

108. The device or system of item 107, wherein the parameters contain line spacing, font and font size.

109. The device or system of item 107, wherein calculate the coordinates and sizes of the first units waiting to be arranged by the parameters described above.

110. The device or system of item 107, wherein the parameters mentioned above are stored in the data structure.

111. The device or system of item 101, wherein a transmission module is further comprised if the communication function between the multiple devices is not fully implemented by the same device.

112. The device or system of item 111, wherein the code of the content of the web page is issued by the server through the transmission steps described; and is visualized and displayed by software and hardware of the client side, such as browser.

113. A device or system that achieves the non-traditional arrangement comprises a storage module, a processing module, the storage module stores the target text and the necessary information in the course of the operation of the device or system, and the said processing module coordinates with, controls the work of other modules in the system.

114. The device or system of item 113, wherein the processing module can be implemented by a micro-controller or microprocessor.

115. The device or system of item 113, wherein further comprising a visual rendering module.

116. The device or system of item 115, wherein the visual rendering module comprises: a display module, a print module, a rendering module used to render the specific effects of characters.

117. The device or system of item 101, wherein when it comes to user input, the calculation of the position of the cursor is undertaken by part or all of the processing module, or it includes a positional calculation module, which is carried out by a separate device.

118. The device or system of item 113, wherein further comprising an input module, obtaining user input information.

119. The device or system of item 118, wherein the input module may contain the hardware and software interface of the input device, such as the usb interface, the driver of the keyboard, or the input device, such as a keyboard, tablet, mouse, microphone.

120. The device or system of item 113, wherein a transmission module is further comprised if the communication function between the multiple devices is not fully implemented by the same device.

121. The device or system of item 120, wherein the code of the content of the web page is issued by the server through the transmission steps described; and is visualized and displayed by software and hardware of the client side, such as browser.

122. A method for presenting the results of the input in the way arranged in the non-traditional arrangement above to the final reader or editing the content that has been rendered in the non-traditional arrangement above, comprising the following steps: location indication, specifying the location of the input or edit in the text or blank region that already exists.

123. The method of item 122, wherein the location can be indicated by the user's input or editing the indication mark.

124. The method of item 123, wherein the indication mark is a flashing cursor when the results can be displayed dynamically by the displayed unit.

125. The method of item 124, wherein the number of said indication mark is plural.

126. The method of item 124, wherein the identification contains plural letters, symbols or characters, such as traditional inverse selection.

127. The method of item 124, wherein the user may freely move the indication marker, for example using an input device such as a keyboard keystroke and/or mouse to move and/or specify the location of the indication marker.

128. The method of item 127, wherein when the indication is identified as a cursor, it can be moved below each editable character.

129. The method of item 127, wherein the coordinates of these selectable locations can be calculated by the rendered front size of the symbols entered by the user, the shape of symbols and the non-traditional arrangements of the present invention used by the user.

130. The method of item 127, wherein apply one of the following operations at the specified location mentioned above: enter, insert, delete, copy, paste, cut, overwrite, and rewrite.

131. The method of item 130, wherein further comprising an arrangement step, arranging according to the user input, paste, override or rewrite the contents and in accordance with the non-traditional arrangement described in the present invention during the process of input or insertion or deletion or deletion or copying or cutting or overwriting or rewriting.

132. The method of item 131, wherein the arrangement is the non-traditional arrangement disclosed in the present invention.

133. The method of item 131, wherein the arrangement can be real-time.

134. The method of item 133, wherein the display process of the real-time arrangement is to present the information in accordance with the way described in the present invention.

135. The method of item 134, wherein render the content by calling the corresponding components in the user's graphical interface through the encoding of the user's input.

136. The method of item 133, wherein after the user enters each first-level unit, the first-level unit is immediately moved to the position at which it should be put based on the first-level unit arrangement in the non-traditional arrangement in the present invention.

137. The method of item 133, wherein after the user has entered each second-level unit, the contents of the second-level unit are arranged in positions according to the non-traditional arrangement in the present invention, and the second-level units are arranged in positions in accordance with the non-traditional arrangement in the present invention.

138. The method of item 133, wherein each letter, character, or character entered by the user can be temporarily displayed to give feedback to the user during the unfinished process of the above input first- and/or second-level units.

139. The method of item 131, wherein the arrangement can be time-lapse arrangement.

140. The method of item 139, wherein the delay can meet a specific condition, such as a delay of a certain amount of time.

141. The method of item 139, wherein the delay can be triggered according to conditions such as what the user enters, for example, when the user enters a second second-level unit, the system can detect the end position of the first second-level unit entered by the user, so that the first second-level unit can be arranged.

142. The method of item 139, wherein the delay can be a time for the user actively controls, or can be triggered when the user saves the entire file, it can also be triggered when the user sends it.

143. The method of item 139, wherein the display process presenting the information in accordance with the technical scheme described in the present invention.

144. The method of item 143, wherein the display process is encoded by the user input and presented by calling the corresponding components in the user's graphical interface.

145. The method of item 139, wherein after the user enters each first-level unit and meet the certain condition, the first-level unit is immediately moved to the position at which it should be put based on the first-level unit arrangement in the non-traditional arrangement in the present invention.

146. The method of item 139, wherein after the user has entered each second-level unit and meet certain condition, the contents of the second-level unit are arranged in positions according to the non-traditional arrangement in the present invention, and the second-level units are arranged in positions in accordance with the non-traditional arrangement in the present invention.

147. The method of item 139, wherein each letter, character, or character entered by the user can be temporarily displayed to give feedback to the user during the unfinished process of the above input first- and/or second-level units.

148. The method of item 131, when transmitting information between multiple devices, for example, in applications such as communication between multiple mobile devices through instant chat software or between servers and clients, it is not necessarily required that all of the above steps be completed by the devices used for input or editing, as long as these steps are completed as a whole by sending or receiving devices used by the user to enter or edit the information.

149. The method of item 148, wherein the sender who inputs and edits merely saves the input text, and the parameters of the non-traditional arrangement of the present invention are transmitted to the receiver, or the receiver is explicitly notified or in accordance with the default parameters to display the information sent by the sender.

150. The method of item 149, wherein the input method is implemented by the smart phone input method, the input user can display the text information he or she enters only in the traditional arrangement, and the receiver can display the contents received by the instant chat software in accordance with the non-traditional arrangement of the present invention.

151. The method of item 130, wherein the input can contain handwriting, keyboard, voice and other input methods.

152. The method of item 122, wherein the display area containing sings or complex numbers is used to display the input and/or final arrangement results of the user presented in a traditional manner.

153. The method of item 152, wherein when the number of display area is single, the user may conveniently switch between rendering in a traditional manner and rendering in the final arrangement of the results described in the present invention, for example, using a keyboard, a key on the mouse or a shortcut key or a key on a graphical interface.

154. The method of item 152, wherein When the number of display regions is plural, where the first display region always displays the target text in the traditional way, the contents rendered in the manner described in the present invention described above in the steps are presented in one or more regions other than the first display region.

155. The method of item 122, wherein the system or device used to implement the method further comprising a graphical user interface.

156. The method of item 155, wherein the said user interface does not have to occupy the entire display domain of the display device.

157. The method of item 155, wherein further comprising steps to generate the final rendered results in a non-text format, such as a picture format, and in some cases, users can generate pictures, pdfs, and other formats with the result of the final rendering, so that in the process of dissemination, even if the reader lacks software that can render the text information in the non-traditional arrangement described in the present invention, she can also read pictures of the text rendered in the non-traditional arrangement described in the present invention.

158. A device or system presenting the results of the input arranged in the non-traditional arrangement mentioned above to the final reader or to the device or system that edits the content rendered in the non-traditional arrangement mentioned above, comprising the following module: the display module.

159. The device or system of item 138, wherein the display module contains an input or edit region that allows the user to specify the location of the input or edit in the region of text or blank that already exists in that region.

160. The device or system of item 159, wherein the location can be indicated by the indication mark at the position of the user's input or edit.

161. The device or system of item 160, wherein the indication mark is a flashing cursor when the results can be displayed dynamically by the displayed unit.

162. The device or system of item 161, wherein the number of indication mark is plural.

163. The device or system of item 161, wherein the identification contains plural letters, symbols or characters, such as traditional inverse selection.

164. The device or system of item 161, wherein the user may freely move the indication marker, for example using an input device such as a keyboard keystroke and/or mouse to move and/or specify the location of the indication marker.

165. The device or system of item 164, wherein when the indication is identified as a cursor, it can be moved below each editable character.

166. The device or system of item 164, wherein the coordinates of these selectable locations can be calculated by the rendered front size of the symbols entered by the user, the shape of symbols and the non-traditional arrangements of the present invention used by the user.

167. The device or system of item 158, wherein the display module also comprises the following functions, applying one of the following operations at the specified location mentioned above: enter, insert, delete, copy, paste, cut, overwrite, and rewrite.

168. The device or system of item 167, wherein the input can comprise handwriting, keyboard, voice and other input methods.

169. The device or system of item 158, wherein comprises arrangement module. In the process of enter or insertion or deletion or copying or pasting or cutting or overwriting or rewriting, according to the content of user input, paste, overwrite or rewrite the content is arranged in the non-traditional arrangement described in the present invention.

170. The device or system of item 169, wherein the arrangement is the non-traditional arrangement disclosed in the present invention.

171. The device or system of item 169, wherein the arrangement can be real-time.

172. The device or system of item 171, wherein the display process of the real-time arrangement is to present the information in accordance with the way described in the present invention.

173. The device or system of item 172, wherein render the content by calling the corresponding components in the user's graphical interface through the encoding of the user's input.

174. The device or system of item 171, wherein after the user enters each first-level unit, the first-level unit is immediately moved to the position at which it should be put based on the first-level unit arrangement in the non-traditional arrangement in the present invention.

175. The device or system of item 171, wherein after the user has entered each second-level unit, the contents of the second-level unit are arranged in positions according to the non-traditional arrangement in the present invention, and the second-level units are arranged in positions in accordance with the non-traditional arrangement in the present invention.

176. The device or system of item 171, wherein each letter, character, or character entered by the user can be temporarily displayed to give feedback to the user during the unfinished process of the above input first-and/or second-level units.

177. The device or system of item 169, wherein the arrangement can be a time-lapse arrangement.

178. The device or system of item 177, wherein the delay can be a specific condition that is met, such as a delay of a certain period of time.

179. The device or system of item 177, wherein the delay can be triggered according to conditions such as what the user enters, for example, when the user enters a second second-level unit, the system can detect the end position of the first second-level unit entered by the user, so that the first second-level unit can be arranged.

180. The device or system of item 177, wherein the delay can be a time for the user actively controls, or can be triggered when the user saves the entire file, it can also be triggered when the user sends it.

181. The device or system of item 177, wherein the display process presenting the information in accordance with the technical scheme described in the present invention.

182. The device or system of item 181, wherein the display process is encoded by the user input and presented by calling the corresponding components in the user's graphical interface.

183. The device or system of item 177, wherein after the user enters each first-level unit and meet the certain condition, the first-level unit is immediately moved to the position at which it should be put based on the first-level unit arrangement in the non-traditional arrangement in the present invention.

184. The device or system of item 177, wherein after the user has entered each second-level unit and meet certain condition, the contents of the second-level unit are arranged in positions according to the non-traditional arrangement in the present invention, and the second-level units are arranged in positions in accordance with the non-traditional arrangement in the present invention.

185. The device or system of item 177, wherein each letter, character, or character entered by the user can be temporarily displayed to give feedback to the user during the unfinished process of the above input first-and/or second-level units.

186. The device or system of item 169, wherein when transmitting information between multiple devices, for example, in applications such as communication between multiple mobile devices through instant chat software or between servers and clients, it is not necessarily required that all of the above steps be completed by the devices used for input or editing, as long as these steps are completed as a whole by sending or receiving devices used by the user to enter or edit the information; in this case, it also contain transmission module, used to transmit information between different devices.

187. The device or system of item 186, wherein the sender who inputs and edits merely saves the input text, and the parameters of the non-traditional arrangement of the present invention are transmitted to the receiver, or the receiver is explicitly notified or in accordance with the default parameters to display the information sent by the sender.

188. The device or system of item 187, wherein the input method is implemented by the smart phone input method, the input user can display the text information he or she enters only in the traditional arrangement, and the receiver can display the contents received by the instant chat software in accordance with the non-traditional arrangement of the present invention.

189. The device or system of item 158, wherein the display module contains a graphical user interface.

190. The device or system of item 189, wherein the graphical user interface does not necessarily occupy the entire display domain of the display device.

191. The device or system of item 189, wherein the user graphical interface can also generate the resulting results in a non-text format, such as a picture format, and in some cases, users can generate pictures, pdfs, and other formats with the result of the final rendering, so that in the process of dissemination, even if the reader lacks software that can render the text information in the non-traditional arrangement described in the present invention, she can also read pictures of the text rendered in the non-traditional arrangement described in the present invention.

192. The device or system of item 158, wherein comprising storage module, to store the target text.

193. The device or system of item 192, wherein the said storage module is a text storage data structure.

One:

In one embodiment, for languages in which there is no formatted mark between words (such as the spaces between adjacent words in English) in the sentence, such as Chinese whose elements are single characters (Chinese characters), and Japanese, whose elements are Chinese characters, hiraganas, katakanas, the first-level units can be single character, hiragana, katakana, punctuation and space. Taking Chinese language as an example, the first-level units are arranged from top to bottom along multiple curves or straight lines, such as three rows. Optionally, the first-level units are arranged longitudinally first, then laterally. Optionally, the arrangement direction of the first-level unit may be arranged along any direction.

Optionally, the punctuation is arranged with its adjacent graphics, images, text, symbols, spaces, or objects, and the arrangement of the punctuation marks follows the arrangement rules of the graphics, images, text, symbols, spaces, or objects to which they are attached and/or adjacent (FIG. 1a).

Optionally, the arrangement of the second-level units is from top to bottom and/or from bottom to top. Optionally, the arrangement is arranged first longitudinally and then laterally. Optionally, the arrangement is arranged first laterally and then longitudinally. Optionally, when the second-level units are arranged along a straight line or curve to or near the edge of the display domain, they continue to arrange along another curve or line (FIG. 1b). Optionally, the arrangement direction of the second-level unit may be arranged in any direction. The second-level units arranged along the multiple curves are marked with interval markers so that different units can be separated.

FIG. 1b shows the examples of the first-level units and the second-level units in this embodiment. Its content is the following text: "中国古代有个寓言，叫做"愚公移山"。说的是古代有一位老人，住在华北，名叫北山愚公。他的家门南面有两座，大山挡住他家的出路，一座叫做太行山，一座叫做王屋山。愚公下决心率领他的儿子们要用锄，头挖去这两座，大山。有个，老头子名叫，智叟的看了发笑，，说是你们这，样干未免太愚蠢了，要挖掉这样门，一座大山是乃，全不可能的。愚公回，你们父了数人，答说：我死了以后有我的儿子，儿子死了，又有孙子，子子孙孙是没有穷尽的。" The said first-level units, which extend to the end of the display domain (the right boundary of the display domain) by the arrangement said above, form two second-level units, e.g. the first second-level unit and the second second-level unit, respectively (FIG. 1b). That is, the present embodiment can be considered to be consist of two second-level units arranged longitudinally in the direction from top to bottom. FIG. 1c shows the direction of the first-level unit arrangement in FIG. 1a.

Optionally, the method of reading this embodiment is that readers gaze at the middle line in a second-level unit and then move the gaze point until the field of view moves from one end of the said second-level unit to the other. The process of movement can be a smooth, scanning movement, or a jump from one position to another. Optionally, the interval between jump movements can also include pauses for a certain length of time. For example, a reader can start by looking at the character "国" of the middle line of the first second-level unit and read it one by one until the character "要" at the end of the second-level unit. When read this content, optionally, one can maintain the region of entire graph, image, text, symbols, spaces or objects in the appropriate range of the visual receptor, such as the human eye angle, so that when the gaze point gazes at the middle line of any second-level unit, its upper and lower content in the same second-level unit is also in the range that can be felt and recognized by the receptor, such as in the field of view. In the course of the experiment, the inventors found that, after some training, readers will naturally identify the graphics, images, text, symbols, spaces or objects comprised in the present invention in a non-traditional arrangement. Comprises embodiment number 61 in the table.

For alphabet-based languages or text systems, such as English, a first-level unit comprises single letter, punctuation, and spaces. Its content can be the following text: "We should live every day with gentleness, vigor and a keenness of appreciation which are often lost when time stretches before us in the constant panorama of more days and months and years to come." The said first-level units are arranged from top to bottom along multiple lines or curves, such as three lines, optionally, the first-level units are arranged longitudinally and then laterally (FIG. 2).

In an embodiment, optionally, first-level units are arranged from bottom to top along multiple lines or curves such as three lines (FIG. 3).

In an embodiment, optionally, the first-level units are arranged from top to bottom and bottom-to-top along multiple straight lines or curves such as three lines. Optionally, first-level units are arranged along multiple straight lines or curves, such as three rows, alternating from top to bottom and bottom to top (FIG. 4).

In an embodiment, optionally, the first-level units are arranged along even numbers of straight lines or curves, for example, along two lines (FIG. 5). In this case, optionally, the reader reads in such a way that the reader's gaze point lands on the position near the lateral centerline of a second-level unit, that is, the middle position of the two rows near the lateral centerline, and then moves further one by one until the field of view moves from one end of the second-level unit to the other. For example, a reader can start by looking at the middle point between the character "中" and the character "国" locate at the beginning of the first second-level unit, and read them one by one until it reaches the middle point between the character "下" and the character "下"

at the end of the second-level unit. When read this content, optionally, one can maintain the region of entire graph, image, text, symbols, spaces or objects in the appropriate range of the visual receptor, such as the human eye angle, so that when the gaze point gazes at the middle line of any second-level unit, its upper and lower content in the same second-level unit is also in the range that can be felt and recognized by the receptor (e.g. as in the field of view).

In some embodiment, it is optional that the first-level units arranged on different curves or straight lines along the multiple curves or lines are not aligned with the other first-level units along adjacent curves on the multiple curves or straight lines (FIG. 6).

In an embodiment, the second-level units cover a region formed by the limitations of the display domain. For character-based languages or text systems, such as Chinese, a first-level unit comprises individual characters, punctuation, and spaces. Second-level units comprise region that are formed by the limits of the display domain, punctuation, and spaces. Alternatively, it can be thought that when a first-level unit comprises punctuation and spaces, some second-level units can comprise a single number of first-level units. First-level units form second-level units by arranging along straight lines and/or curves. That is, the first-level units are arranged in a specific way, extending to the boundaries of the display domain, forming a second-level unit. Optionally, the entire display domain comprises multiple second-level units. Optionally, for materials consisting of graphics, images, text, symbols, spaces, or objects, the reader can also choose the region and size of the second-level unit.

Two:

In one embodiment, the said second-level units comprise words. For alphabet-based languages or text systems, such as English, a first-level unit consists of individual letters, punctuation, and spaces. Second-level units comprise individual words, punctuation, and spaces. Or when first-level units comprise punctuation and spaces, some second-level units can comprise a single number of first-level units.

Optionally, the first-level units are arranged from top to bottom along multiple lines or curves such as two lines. optionally, the first-level units are arranged longitudinally first and then laterally. Optionally, the first-level units are arranged laterally first and then longitudinally.

As shown in FIG. 7, the following text reads: "We should live every day with gentleness, vigor and a keenness of appreciation which is often lost when stretches before us in the constant panorama of more days and months and years to come. There are those, of course, who would adopt the Epicurean motto of "Eat, drink, and be merry". But most people would be chastened by the certainty of impending death." Optionally, when the longitudinal height of some of these second-level units (the "a" in FIG. 7) is different from the longitudinal height of other second-level units (other second-level units in the same lateral direction as "a" in FIG. 7), align the centers of the second-level units in the same lateral direction to the same lateral line. Optionally, each punctuation mark or group of gathered punctuation is treated as a separate second-level unit. Comprises technical solution 21 in Table 1.

Optionally, the interval marks may be included between multiple said second-level units. The said interval marks comprise space intervals, symbols, letters, and numbers. The role of the interval marks is to make it possible to be separated content that belongs to the different units.

For character-based languages or text systems, such as Chinese, a first-level unit comprises single character, punctuation, and space. A second-level unit comprises words, punctuation marks, spaces, or a combination of them, such as phrases. Alternatively, it can be thought that when first-level units comprise punctuation and spaces, some second-level units can comprise a single first-level unit. First-level units form second-level units by arranging along straight lines and/or curves. Optionally, the arrangement is only along the longitudinal or lateral arrangement. Optionally, spaces can be included between the second-level units (FIG. 8). The content can be: 中国/古代/有个/寓言/，

/叫做/"愚公/移山"。/说的是/古代/有一位/老人/。，　　　　/住在/，　　　　华北/，
/他的/家门/南面/有，　/名叫/北山/愚公/。，　两座/大山/挡，　上/他家的/出路/，，　/一，　座/叫做/太行山/，　愚公/下决心/率领，　他的/儿子们/要用/锄头，　/一座/叫做/王屋山/。，　　/挖去/这两座/大山/。，　　/有个/老头子/名，　叫/智叟的/看了/发笑/，，　/说是/你们/这样干/，　未免/太/愚蠢了/，　/你们/父子/数人/要挖持，　/这样/两座/大山/，　是/完全/不/可能的/。/，　愚公/回答说/：/我/死了/以后/有/我的/儿子/，/儿子/死了/，/又有/孙子/，/子子孙，孙/是/没有/穷尽的/。"Where "/" represents the interval mark between the second-level units.

Optionally, the said first-level units arranged along multiple straight lines or curves (FIG. 9) is not aligned with the other first-level units along adjacent curves or straight line on the said multiple curves or straight lines (FIG. 10).

Three:

In an example, the second-level units comprise phrases, phrases, and sense groups. For alphabet-based languages or text systems, such as English, a first-level unit comprises single letter, punctuation, and space. A second-level unit comprises sense group, punctuation, and space. Alternatively, it can be thought that when a first-level unit comprises punctuation and space, some second-level units can comprise multiple first-level units. Optionally, the said first-level units are arranged from top to bottom along multiple lines or curves such as two lines. Optionally, the said first-level units are arranged longitudinally first and then laterally.

Optionally, the way of arrangement of the second-level units is from top to bottom and/or from bottom to top. Optionally, the way of arrangement is first longitudinally and then laterally. Optionally, the way of arrangement is first laterally and then longitudinally. Alternatively, when the second-level units arranged along a straight line or curve extend to or near the edge of the display domain, it continues to be arranged along another curve or straight line. Optionally, the arrangement direction of the second-level unit may be arranged in any direction (FIG. 11). It reads: "We /should live/every day/with gentleness/, /vigor/and/a keenness of appreciation/which/are/often lost/when/time stretches/before us/in the constant panorama of/more days and months and years/to come/." Contains technical solution 31 in Table 1.

For character-based languages or text systems, such as Chinese, a first-level unit comprises a single character, punctuation and space. A second-level unit comprises phrases, phrases, sense groups, punctuation, spaces, or a combination of them. Alternatively, it can be thought that when a first-level unit comprises punctuation and space, some second-level units can contain a single first-level unit. A first-level unit forms a second-level unit by arranging along straight lines and/or curves. Optionally, spaces can be included between the second-level units (FIG. 12). It is written in the following words: 中国/古代/有个/寓言/，
他的/家门/南面/有两，　/叫做/"/愚公/移山/"。，　/说的是/古代/有一位，　老人/，
/住在/华北/，/愚公/下决心/率，座/大山/挡住他家的/出，/名叫/北山/愚公/。，路/，
/一座/叫做/太行山/，/有个/老头子/名叫，智叟的/看了/发笑/，，领他的/儿子们/要用，/一座/叫做/王屋山/。，　　锄头/挖去/这两座/大山/。，　　说是/你们/这样干/，未免/太/愚蠢了/，　挖掉/这样/两座/大，/你们/父子/数人/要，山/是/完全/不/可能的/。
"Where "/" represents the interval mark between the second-level units. Optionally, within a second-level unit, the first-level units arranged in the longitudinal direction first and then in the lateral direction.

Optionally, for character-based languages or text systems, such as Chinese, a first-level unit comprises single character, punctuation, and space. A second-level unit comprises phrases, phrases, groups, punctuation, spaces, or a combination of them. Alternatively, it can be thought that when a first-level unit comprises punctuation and space, some second-level units can contain a single first-level unit. First-level units form second-level units by arranging along straight lines and/or curves. Optionally, within a second-level unit, the first-level units arranged in the lateral direction first and then in the longitudinal direction (FIG. 13). It is written in the following words: 中国/古代/有个寓言/，
/叫做/"/愚公/移山/"。，　说的是/古代/有一位老人/，　/住在/华，　北/，
/他的/家门/南面/，/有/两/座大山/，/名叫/北山/愚公/ "where "/" represents the interval mark between the second-level units.

Optionally, the interval marks may be included between the two second-level units. The interval mark comprises space intervals, symbols, letters, and numbers.

Optionally, the first-level units are arranged along multiple straight lines or curves. Alternatively, the first-level units arranged on different curves or straight lines along the multiple curves or lines are not aligned with the other first-level units along adjacent curves on the multiple curves or straight lines (FIG. 14). Or it can be understood that within a second-level unit, the first-level units are arranged in the following two-step way: first step, they are arranged from top left to the bottom right; then, the resulting units formed in the first step are arranged laterally.

Four:

In one embodiment, the second-level units comprise parts formed by punctuation segmentation. For alphabet-based languages or text systems, such as English, a first-level unit comprises single letter, punctuation, and space. A second-level unit comprises parts formed by punctuation segmentation, punctuation marks, spaces, or a combination of them. Alternatively, it can be thought that when a first-level unit comprises punctuation and spaces, some second-level units can comprise a single first-level unit. Optionally, the said first-level units are arranged from top to bottom along multiple lines or curves such as two lines. Optionally, the first-level units are arranged along the longitudinal direction first and then along the lateral direction (FIG. 15). Its content is the following text: "We should live every day with gentleness, vigor and a keenness of which are often lost when stretches before us in the constant panorama of more days and months and years to come. There are those, of course, who would adopt the Epicurean motto of "Eat, drink, and be merry". But most people would be chastened by the certainty of impending death." Contains technical scenario 41 in Table 1.

For character-based languages or text systems, such as Chinese, a first-level unit comprises single character, punctuation, and space. A second-level unit comprises parts, punctuation marks, spaces, or a combination of them. Alternatively, it can be thought that when a first-level unit comprises punctuation and space, some second-level units can comprise a single first-level unit. First-level units form second-level units by arranging along straight lines and/or curves. Optionally, spaces can be included between the second-level units (FIG. 16). Its content is the following text: 中国占代有个寓言，　叫做"愚公移山"。，

说的是占代有一位老人，，　　住在华北，　　名叫北山愚公。，

他的家门南面有两座，大山挡住他家的出路，，一座叫做，太行山，

愚公下决心率领他的儿，　,子们要用锄头挖，　去这两座大山。，

一座叫做王屋山。，　　有个老头子名，　叫智叟的看了发笑，，

是完全不可能的。，　愚公回答说：，　我死了以后有我的儿子，，

说是你们这样干未免太愚蠢了，　你们父子数人，　要挖掉这样两座大山，

儿，子死了，又有孙子，子子孙孙是没有穷尽的。" "Optionally, the first-level units are arranged from top to bottom by multiple lines or curves such as two lines. optionally, the first-level units are arranged longitudinally and then laterally.

In one embodiment, a first-level unit comprises a single character, letter, hiraganas, katakanas, punctuation, and spaces. A second-level unit contain parts formed by punctuation segmentation, punctuation marks, spaces, or a combination of them. First-level units form second-level units by arranging along straight lines and/or curves. Optionally, spaces can be included between the second-level units. In Japanese, for example, FIG. 17*a* shows the content arranged in the traditional way. FIG. 18*b* shows this content arranged in an non-traditional way. Optionally, the said first-level units are arranged from top to bottom along multiple lines or curves such as two lines. Optionally, the first-level units are arranged in the longitudinal direction first and then in the lateral direction.

Optionally, within a second-level unit, the first units are arranged in the direction of curves. The curves comprise a structure that is an overall helix. Optionally, according to the location on the curves or straight lines or the content of the second-level unit, such as characters, letters, syllables, words, phrases, phrases, sense groups, the contents of the second-level unit may have different font sizes, fonts, patterns, orientations, colors, blurriness and other appearance differences. FIG. 18*a*, for example, represents the result of two different second-level units arranged in an non-traditional arrangement. The original text is: "" 中国占代有个寓言 and 他的家门南面有两座大山挡住他家的出路 " FIG. 18*b* represents the curves and directions of the distribution of the two. The two are distributed along a overall spiral direction, and the size of the graph, image, text, symbol, space, or object decreases in size gradually along the direction of the distribution.

Optionally, within a second-level unit, the curves along which the first units arrange comprise a structure that is overall elliptical structure. Optionally, according to the location on the curves of straight lines or the content of the second-level units, such as characters, letters, syllables, words, phrases, phrases, sense groups, the contents of the second-level unit may have different font sizes, fonts, patterns, orientations, colors, blurriness and other appearance differences. FIG. 19*a*, for example, represents the result of two different second-level units arranged in non-traditional arrangement. The content text is: 中国占代有个寓言 FIG. 19*b* represents the curves and directions of the distributions of the two. The two are distributed in the direction of two overall ellipsis.

While reading, the reader can acquire the most of a second-level unit or an entire second-level unit at once or in a relatively short period of time by staying the gaze point near the center of the curve, using the field of view.

Optionally, the interval mark may be included between the two second-level units. The interval marks comprise space intervals, symbols, letters, and numbers.

Optionally, the said first-level units are arranged along multiple straight lines or curves. Alternatively, the first-level units arranged on different curves or straight lines along the multiple curves or lines are not aligned with the other first-level units along adjacent curves on the multiple curves or straight lines (FIG. 20).

Five:

In one embodiment, the said second-level unit comprises sentence. For character-based languages or text systems, such as Chinese, a first-level unit comprises single character, punctuation, and spaces. A second-level unit comprises sentence, punctuation mark, space, or their combination. Alternatively, it can be thought that when a first-level unit comprises punctuation and space, some second-level units can comprise a single first-level unit. First-level units form second-level units by arranging along straight lines and/or curves. Optionally, the first-level units arrange from top to bottom along multiple lines or curves such as two lines. Optionally, the first-level units are arranged in the longitudinal direction first and then in the lateral direction (FIG. 21). Its content is the following text: 中国占，代有个寓言，

叫做"愚公移山"。说的是古代有一位老人，　住在华北　，名叫北山愚　，

公。他的家门南面有两座大山挡住他家的出路　，　　　子们要用锄头挖去这，

一座叫做太行山，　　一座叫做王屋　，　两座大山。有个老头子名叫智叟　，

山。愚公下决心率领他的儿，　的看了发笑　，说是你们这样干未免太愚蠢了，

你们父子数人要挖掉这样两座大山　，　　　是完全不可能的。愚公回答说　，

我死了以后有我的儿子　，　　儿子死了　，　　又有孙子，

子子孙孙是没有穷尽的。" "Includes technical scenario 51 in Table 1.

Optionally, the interval marks may be included between the two second-level units. The interval marks comprise space intervals, symbols, letters, and numbers. Optionally, the said first-level units arranged along multiple straight lines or curves. Alternatively, the first-level units arranged on different curves or straight lines along the multiple curves or lines are not aligned with the other first-level units along adjacent curves on the multiple curves or straight lines (FIG. 22).

In an embodiment, the said second-level units comprise parts formed by punctuation segmentation. For alphabet-based languages or text systems, such as German, a first-level unit comprises word, punctuation, and space. A second-level unit comprise parts formed by punctuation segmentation, punctuation marks, spaces, or a combination of them. Alternatively, it can be thought that when a first-level unit comprises punctuation and space, some second-level units can comprise a single first-level unit. Optionally, the said first-level units are arranged from top to bottom along multiple lines or curves such as two lines. Optionally, the said first-level units arranged in the longitudinal direction first and then in the lateral direction (FIG. 23). FIG. 23a shows the content arranged in the traditional way. FIG. 23b shows the content arranged in an non-traditional way. Contains technical solution 43 in Table 1.

Similarly, take French as an example (FIG. 24). FIG. 24a shows the content in this language arranged in the traditional way. FIG. 24b shows the content arranged in an non-traditional way.

Similarly, take Italian (FIG. 25) as an example. FIG. 25a shows the content arranged in the traditional way. FIG. 25b shows the content arranged in an non-traditional way.

Similarly, take Spanish (FIG. 26) as an example. FIG. 26a shows the content arranged in the traditional way. FIG. 26b shows the content arranged in an non-traditional way.

Similarly, take Korean as an example (FIG. 27). FIG. 27a shows the content arranged in the traditional way. FIG. 27b shows the content arranged in an non-traditional way. In a language like Korean, a first-level unit comprises, in addition to single word, a part of a single word that is associated with its aid.

Similarly, take Arabic, for example. Its contents are shown in FIG. 28a, and the rendering results are shown in FIG. 28b. Note that according to standard Arabic custom, the direction of reading is right to left.
Six:

For character-based languages or text systems, such as Chinese, a first-level unit comprises single character, punctuation, and space. A second-level unit comprises parts formed by punctuation segmentation, punctuation marks, spaces, or a combination of them. Alternatively, it can be thought that when a first-level unit comprises punctuation and space, some second-level units can comprise a single first-level unit. First-level units form second-level units by arranging along straight lines and/or curves. Optionally, spaces can be included between the second-level units.

Its content is the following text: 中国古代有个寓言，叫做"愚公移山"。说的是占， 代有一位老人， 住在华北， 他的家门南面有两，i座大山挡住他家的， 名叫北山愚公。， 出路， 一座叫做太行山， 智叟的看了发笑，， 一座叫做王屋山。， 愚公下决心率领他 的儿子们要用锄头， 挖去这两座大山。， 有个老头子名叫， 智叟的看了发笑，，说是你们这样下未免太愚蠢 ，了，掉这样两座大山是， 完全不可能的。， 你们父子数人要挖， 愚公回答说．我死了以 ， 后有我的儿子， 儿子死了，又有孙子， 子子孙孙是没有穷尽的。 "Optionally, the said first-level units are arranged from top to bottom along multiple lines or curves such as two lines. Optionally, the first-level units are arranged in the longitudinal direction first and then in the lateral direction.

While reading, the reader can acquire the most of a second-level unit or an entire second-level unit at once or in a relatively short period of time by staying the gaze point near the center of the curve, using the field of view.

Optionally, the interval marks may be included between multiple said second-level units. The interval marks comprise space intervals, symbols, letters, and numbers.

Optionally, the said first-level units arranged along multiple straight lines or curves. the first-level units arranged on different curves or straight lines along the multiple curves or lines are not aligned with the other first-level units along adjacent curves on the multiple curves or straight lines.
Seven:

In one embodiment, the said second-level units comprise units formed by freely specifying. For example, in a literary style such as poetry, in traditional arrangements, the author is usually free to divide and put graphics, images, text, symbols, spaces, or objects on different lines. In some case, the way to put them on different lines is very free, and not restricted by grammar. In the case of poetry, which contains, but is not limited to, the second-level units of this embodiment may be each line (if it is written in the lateral direction) or column (if it is written in the longitudinal direction) of the poem specified by the original author.

In one embodiment. For example, during gene sequencing, the original genetic signals produced from the gene sequencing instrument are usually arranged by means of four base symbols, A, T, C, and G, through certain conversions. This arrangement is very difficult for manual identification and reading, because the type and arrangement of the bases that make up the "genes" are not certain and regular, and the length of a gene can be very long (up to the kbp level). In this case, the second-level units of this embodiment comprise separate genes. It is important to note that for a particular biological nucleotide sequence, it contains genes that can overlap. Therefore, for nucleotide sequences like this, the division of the second-level units contained in this embodiment is not unique. For example, the original sequence is: "agccttcagcacctctcttctgcgg". Suppose it contains two genes, "agccttcagccgacctct" and "attcttctgcgg". One can present them in the said arrangement. As shown in FIG. 29, each gene is one second-level unit and each base symbol is one first-level unit, the second-level units are arranged on two lateral lines, and inside each second-level unit, units are arranged from top-down and in the longitudinal direction first and then in the lateral direction. There are interval marks between second-level units. The said interval marks comprise space intervals, symbols, letters, and numbers. Contains technical solution 71 in Table 1. Optionally, fragments of genes can also be defined as first- or second-level units.

Optionally, there are said interval marks between second-level units. The said interval marks comprise space intervals, symbols, letters, and numbers.

Optionally, the said first-level units are arranged along multiple straight lines or curves. the first-level units arranged on different curves or straight lines along the multiple curves or lines are not aligned with the other first-level units along adjacent curves on the multiple curves or straight lines For alphabet-based languages or text systems, one can choose the range of first-level units in an arbitrary way.

Optionally, one can also select the range of second-level units based on the shape of the display domain.

Optionally, for the composition of computer program languages and symbols (commonly known as computer language), such as java, python, etc., the second-level unit comprise units formed by freely specifying, such as some variable names, keywords, symbols, statements on individual lines, bracketed parts, classes, methods. FIG. 30*a* shows a java program code that is arranged in the traditional way. FIG. 30*b* shows that is arranged in a non-traditional way. Set specific keywords, variable names, symbols, and so on as second-level units. The parts of each second-level unit are set to be first-level units. Arrange from top to bottom in general, and then from left to right. Some of these second-level units can be arranged from top left to bottom right, as Bissextile shown in the text. Optionally, a first-level unit can comprise single or multiple syllables. Optionally, the first-stage unit can comprise sections that are split according to syllables but not exactly by syllables. Here's just take a java program as one example of embodiment. Skilled personnel in the art can naturally extend the technical scheme designed by the present invention to any other computer language.

Both the said first and or second-level units can be freely specified. The freely specified way comprises dividing from the grammatical or semantic point of view, according to the word classes, parts of sentence, etc., for example, in the sentence with subject-verb-object pattern, specify subject, verb, object as first-level units, respectively. Specify a combination of objects, verbs and objects, such as a complete sentence or part of a sentence as a second-level unit. Sentences with various other structures are divided in the same way. This can be done by manually marking different sentence compositions, or by specifying which sentence component each part belongs to by the input user when input text information, or by using algorithms in natural language processing in the field of artificial intelligence to distinguish and identify the components in sentences. This algorithm and implementation are well known to engineers in the field, such as those who develop algorithms.

Eight:

In one implementation, the said first-level unit comprises syllables. For alphabet-based languages or text systems, such as English, the first-level unit comprises syllables. A second-level unit comprises words, punctuation, spaces, or a combination of them. As shown in FIG. 31, with the following text: "We should live every day with gentleness, vigor and a keenness of appreciation which are often lost when time stretches before us in the constant panorama of more days and months and years to come. There are those, of course, who would adopt the Epicurean motto of "Eat, drink, and be merry". But most people would be chastened by the certainty of impending death." Optionally, the said first-level units are arranged from top to bottom along multiple lines or curves such as two lines. Optionally, the first-level units are arranged in the longitudinal direction first and then in the lateral direction. Optionally, the centers of the first-level units on the same longitudinal column are aligned with each other. Optionally, there are interval marks between the first-level units. The said interval marks comprise space intervals, symbols, letters, and numbers. Optionally, a first-level unit can comprise single or multiple syllables. Optionally, the first-stage unit can comprise sections that are split according to syllables but not exactly by syllables. Contains technical solution 22 in Table 1.

Optionally, there are interval marks between said second-level units. The said interval marks comprise space intervals, symbols, letters, and numbers.

Alternatively, when there are interval marks between multiple said first-level units and there are interval marks between multiple said second-level units, the interval marks between second-level units are greater than the interval marks between the first-level units.

optionally, the said first-level units are arranged along multiple straight lines or curves. Alternatively, the first-level units arranged on different curves or straight lines along the multiple curves or lines are not aligned with the other first-level units along adjacent curves on the multiple curves or straight lines For alphabet-based languages or text systems, optionally, one can specify the range of first-level units in an arbitrary way.

Optionally, one can also specify the range of second-level units based on the shape of the display domain.

Nine:

In an embodiment, the said first-level unit comprises words, and the said second-level unit contains phrases, phrases, and sense groups. For alphabet-based languages or text systems, such as English, a first-level unit comprises single word, punctuation, and space. The second-level units comprise sense groups, punctuation, and spaces (FIG. 32). It reads: "We/should live/every day/with gentleness/, /vigor/ and/a keenness of appreciation/which/are/often lost/when/ time stretches/before us/in the constant panorama of/more days and months and years/to come/." Where "/" indicates the interval mark between the second-level units. Optionally, the said first-level units are arranged from top to bottom along multiple lines or curves such as two lines.

Optionally, within a second-level unit, the first-level units are arranged in the longitudinal direction first and then the lateral direction. Contains technical solution 33 in Table 1.

Optionally, there are interval marks between multiple said first-level units. The said interval marks comprise space intervals, symbols, letters, and numbers.

Optionally, there are interval marks between multiple said second-level units. The said interval marks comprise space intervals, symbols, letters, and numbers.

optionally, the said first-level units are arranged along multiple straight lines or curves. Alternatively, the first-level units arranged on different curves or straight lines along the multiple curves or lines are not aligned with the other first-level units along adjacent curves on the multiple curves or straight lines. (FIG. 33)

Alternatively, when there are interval marks between multiple said first-level units and there are interval marks between multiple said second-level units, the interval marks between second-level units are greater than the interval marks between the first-level units.

For alphabet-based languages or text systems, one can specify the range of first-level units in an arbitrary way.

Optionally, one can also specify the range of second-level units based on the shape of the display domain.

For character-based languages or text systems, such as Chinese, a first-level unit comprises single character, punctuation, and space. A second-level unit contain phrases, phrases, sense groups, punctuation, spaces, or a combination of them. It is written in the following words:

"中国古代/有个寓言/, /叫做/"愚公移山/"。说的是，/古代/有一位老人/，/住在华北/，他的家门/南面/，有两座大山/，/名叫/北山愚公/。，挡住他家的出路/，/一座叫做/太行山/，/一座叫做/王屋山/。/愚公/下决心/率领他，的儿子们/要用锄头挖/，这两座大山/。/有个，老头子/名叫智叟的/看了发笑/，，/说，是/你们这样十/未免太愚蠢了/，/你们父子数人/婆，挖掉/这样两座/大山/是完全不可 能的/。 "Where "/" represents the interval mark between the second-level units. (FIG. 34) optionally, the said first-level units are arranged along multiple straight lines or curves. Alternatively, the first-level units arranged on different curves or straight lines along the multiple curves or lines are not aligned with the other first-level units along adjacent curves on the multiple curves or straight lines. (FIG. 35)

Ten:

In an embodiment, the said first-level unit comprises phrases, phrases, and sense groups; and the second-level units comprise parts formed by punctuation segmentation. For alphabet-based languages or text systems, such as English, a first-level unit comprises phrases, phrases, and sense groups. A second-level units contain parts formed by punctuation segmentation, punctuation marks and spaces. Optionally, the said first-level units are arranged from top to bottom along multiple lines or curves such as two lines. Optionally, within a second-level unit, the first-level units are arranged in the longitudinal direction first and then in the lateral direction (FIG. 36). It reads: "We/should live/every day/with gentleness/, /vigor/and/a keenness of appreciation/ which/are/often lost/when/time stretches/before us/in the constant panorama of/more days and months and years/to come/." Where "/" indicates the interval marks between the second-level units. Contains embodiment 44 in Table 1.

Optionally, the first-level units are arranged along multiple straight lines or curves. Alternatively, the first-level units arranged on different curves or straight lines along the multiple curves or lines are not aligned with the other first-level units along adjacent curves on the multiple curves or straight lines (FIG. 37).

Optionally, there are first interval marks between the multiple said first-level units. Optionally, the said first interval mark may be a space, a symbol, a character, such as "/" (FIG. 38).

Optionally, there are first interval marks between the multiple said second-level units. Optionally, the said second interval mark may be a space, a symbol, a character, such as "/".

Alternatively, when there are interval marks between multiple said first-level units and there are interval marks between multiple said second-level units, the interval marks between second-level units are greater than the interval marks between the first-level units.

For alphabet-based languages or text systems, optionally, one can specify the range of first-level units in an arbitrary way.

Optionally, one can also specify the range of second-level units based on the shape of the display domain.

For word-based languages or text systems, such as Chinese, a first-level unit comprises phrase, phrase, and sense group. A second-level unit comprises parts formed by punctuation segmentation. It is written in the following words:

中国古代 ，　　　有个寓言/ ，　　　/叫做/"/愚公移山/"。/说的是/古代/有一位老人/ ，
/住在华北/ ，　/名叫/ ，　　北山愚公/。，　他的家门南面 ，　有两座大山/ ，
当住他家的出路/，，/一座叫做/太行山/ ，　/ ，　/愚公/下决心/率，　/愚公/下决心/率，
领他的儿子们/厦 ，　用锄头挖去/ఉ ，　两座大山/。/ ，　/一座叫做/王屋山/。，

有个老头子/名叫智叟的/看了发笑/ ，

/说是/你们这样干/未免太愚蠢了/ ，　　/你们父 ，　子数人/要挖掉/ ，
这样两座大山。，全完全不可能的/　"Where "/" represents the interval mark between the second-level units (FIG. 39). Optionally, the first-level units are arranged along multiple straight lines or curves. Alternatively, the said first-level units arranged along multiple straight lines or curves. the first-level units arranged on different curves or straight lines along the multiple curves or lines are not aligned with the other first-level units along adjacent curves on the multiple curves or straight lines (FIG. 40). Optionally, there are the first interval marks between the multiple said first-level units. Optionally, the said first interval mark may be a space, a symbol, a character, such as "/". Optionally, within a second-level unit, the first-level units are arranged in the longitudinal direction first and then in the lateral direction.

Eleven:

In an embodiment, the first-level unit comprises parts formed by punctuation segmentation; For alphabet-based languages or text systems, such as English, the following text is: "There are those, of course, who would adopt the Epicurean motto of "Eat, drink, and be merry". But most people would be chastened by the certainty of impending death." Optionally, the first-level units are arranged from top to bottom along multiple lines or curves such as two lines. Optionally, within a second-level unit, the first-level units are arranged in the longitudinal direction first and then in the lateral direction (FIG. 41). Contains embodiment 55 in Table 1.

optionally, the first-level units are arranged along multiple straight lines or curves. Alternatively, the said first-level units arranged along multiple straight lines or curves (FIG. 9). Alternatively, the first-level unit arranged on a different curve or straight line on the multiple curves or lines is not aligned with the adjacent curve or other first-level unit in the complex curve or straight line.

Optionally, there are first interval marks between the multiple said first-level units. Optionally, the said first interval mark may be a space, a symbol, a character, such as Optionally, there are first interval marks between the multiple said second-level units.

Optionally, the said second interval mark may be a space, a symbol, a character, such as "/".

Alternatively, when there are interval marks between multiple said first-level units and there are interval marks between multiple said second-level units, the interval marks between second-level units are greater than the interval marks between the first-level units.

For alphabet-based languages or text systems, optionally, one can specify the range of first-level units in an arbitrary way.

Optionally, one can also specify the range of second-level units based on the shape of the display domain.

For character-based languages or text systems, such as Chinese, a first-level unit comprises parts that are formed by punctuation segmentation. Second-level units comprise sentences. Its content is the following text: 中国古代有个寓言 ，叫做"愚公，　　移山"。说的是古代有一位老人 ，　　住在华北 ，名叫北山愚公。他的家门南面有两 ，　　座大山挡住他家的出路 ，

一座叫做太行山 ，　　　一座叫做王屋山。愚公下决心率领他 ，
的儿子们要用锄头挖去这门，　　　　两座大山。有个老头 ，
子名叫智叟的看了发笑，，　　说是你们 ，　　这样干未免太愚蠢了 ，
这样两座大山是，　，，　完全不可能的。愚公 ，　　你们父子数人要挖捐 ，
回答说：我死了以后有我的儿子 ，　　儿子死了，　　又有孙子 ；
子子孙孙是没有穷尽的。"Where "/" represents the interval mark between the second-level units (FIG. 42). Optionally, the said first-level units are arranged along multiple straight lines or curves. Alternatively, the first-level units arranged on different curves or straight lines along the multiple curves or lines are not aligned with the other first-level units along adjacent curves on the multiple curves or straight lines. Optionally, there are said first interval marks between the multiple said first-level units. Optionally, the said first interval mark may be a space, a symbol, a character, such as "/".

Twelve:

In an embodiment, the said first-level units comprise first-level units divided in other ways; the said second-level units comprise words. For a alphabet-based language or text system, such as English, the said first-level units comprises parts of words, and the said second-level units comprise words. Its content is the following text: "We should live every day with gentleness, vigor and a keenness of appreciation which are often lost when time stretches before us in the constant panorama of more days and months and years to come. There are those, of course, who would adopt the Epicurean motto of "Eat, drink, and be merry". But most people would be chastened by the certainty of impending death." Optionally, the said first-level units are arranged from top to bottom along multiple lines or curves such as two lines. The said first-level units comprise parts formed by dividing second-level unit evenly or as evenly as possible according to the number of multiple straight lines or curves. All these parts are distributed on the multiple said straight lines or curves (FIG. 43). Optionally, within a second-level unit, the first-level units are arranged in the longitudinal direction first and then in the lateral direction. Contains embodiment 27 in Table 1.

Optionally, the said first-level units are arranged along straight lines or curves. Alternatively, the first-level units arranged on different curves or straight lines along the multiple curves or lines are not aligned with the other first-level units along adjacent curves on the multiple curves or straight lines.

Optionally, there are the first interval marks between the multiple said first-level units. Optionally, the said first interval mark may be a space, a symbol, a character, such as Optionally, there are the first interval marks between the multiple said second-level units. Optionally, the said second interval mark may be a space, a symbol, a character, such as "/".

Alternatively, when there are interval marks between multiple said first-level units and there are interval marks between multiple said second-level units, the interval marks between second-level units are greater than the interval marks between the first-level units.

For alphabet-based languages or text systems, one can specify the range of first-level units in an arbitrary way.

Optionally, one can also specify the range of second-level units based on the shape of the display domain.

Thirteen:

A method of converting the traditional arrangement into a non-traditional arrangement, comprises the following steps: 101) distinguishing the first-level units of the target text, and then arrange the first-level units to form second-level units in the non-traditional arrangements mentioned above, and then render them in the display domain.

Optionally, if the system used does not store the target text in advance, get the target text first.

Optionally, if the target text exists in a non-text encoding form, such as in the form of graphics or audio, for example, in the form of an electronic image file obtained from a paper book or in the form of audio, the content contained in it may be recognized, such as image recognition and speech recognition, and converted into code.

Optionally, it is rearranged and rendered by dividing the first-level units in the recognized text code.

Optionally, the visual effects rendered are displayed by text encoding in each first-level unit, through text encoding fonts and display techniques in the system. For example, the image information for individual text in the original electronic version of the image is not used. The advantage is that it is flexible and diverse to produce the final rendering effect, based on the system's font, font size and other information and the characteristics of the module displaying text.

Optionally, if the target text exists in a non-text encoding form, such as in the form of graphics, for example, in the form of an electronic version of an image obtained from a paper book, the first-level units contained in it may be divided, for example, by means of image recognition.

Optionally, the images of the first-level units in the target text, which is separated by recognition, are rearranged and presented in a non-traditional arrangement described in the present invention. The advantage is that one can only recognize the contours and edges of the first-level unit, and don't need to recognize the encoding in the first-level unit, saving the cost of computing and/or storage.

Optionally, one can process parts formed by separating level one unit of target text, such as image enhancement, grayscale adjustment, and so on. For example, in some cases, the text obtained by optical means may be unevenly distributed, such as overall grayscale, contrast, etc., through the above processing, one can improve the result of rearranging the present text in an non-traditional arrangement.

Optionally, one can apply transition operation to inconsistent background patterns and/or brightness and/or colors at seams between flattened plural units, such as apply gradient effect operation.

Optionally, if the target text exists in a non-text encoding form, such as in the form of graphics, for example, in the form of an electronic image file obtained from a paper book, then one can divide the text into first-level units and recognize the content of it. For example, by means of image recognition, the edges and positions of the first-level units are divided at the same time as the text encoding is recognized.

Optionally, it is rearranged and rendered by dividing the first-level units in the recognized text code. However, the result represent is not the result of re-rendering the said code described, but rather images of each first-level unit split out of the original image. The advantage is that one can have flexibility in the way they are presented based on the information in the code, while maintaining the font, picture quality, and so on of the original image.

Optionally, one can process parts formed by separating level one unit of target text, such as image enhancement, grayscale adjustment, and so on. For example, in some cases, the text obtained by optical means may be unevenly distributed, such as overall grayscale, contrast, etc., through the above processing, one can improve the result of rearranging the present text.

Optionally, one can apply transition operation to inconsistent background patterns and/or brightness and/or colors at seams between flattened plural units, such as apply gradient effect operation.

Optionally, one may specify specific parameters, such as line spacing, font, font size and so on according to the non-traditional arrangement of the present invention. It is arranged according to the parameters specified above. For example, the coordinates, sizes, and so on of the first units to be arranged can be calculated from the parameters mentioned above. Store these parameters in a data structure.

Optionally, the distinguishing target text in step 101) can be based on the format of the target text, such as treat each character as each first-level unit, or base on the content of the target text, for example, recognize words, phrases, sense groups, phrases and so on by computer. Optionally, it can be implemented using algorithms in "natural language processing" (NLP) in the field of artificial intelligence. This implementation can be done by people in the field without the need for creative thinking.

It is important to note that the order of the above steps can be adjusted as needed.

When the processing of this method runs on the device that finally renders the result, it also includes a display step that presents the final result. Otherwise, if the processing of this method does not run on the device on which the result was finally rendered, for example, it is running on the server, the display step is not directly required.

Fourteen:

FIG. 44 shows a device or system that converts ways of arrangement, consisting of following modules: distinguishing module, which distinguish the first-level units in the target text; arranging module, which builds second-level units from first-level units. The wires in the figure represent a way in which a module is connected to another.

Optionally, if the system used does not store the target text in advance, it contains acquiring module, which gets the target text first.

Optionally, if the target text exists in a non-text encoding form, such as in the form of graphics or audio, for example, in the form of an electronic image file obtained from a paper book or in the form of audio, the said distinguishing module can recognize the content contained in the target text, such as recognizing image and speech, and convert them into code.

Optionally, it is rearranged and rendered by dividing the first-level units in the recognized text code.

Optionally, the visual effects rendered are displayed by text encoding in each first-level unit, through text encoding fonts and display techniques in the system. For example, the image information for individual text in the original electronic version of the image is not used. The advantage is that it is flexible and diverse to produce the final rendering effect, based on the system's font, font size and other information and the characteristics of the module displaying text.

Optionally, if the target text exists in a non-text encoding form, as in the form of graphics, for example, in the form of an electronic version of an image obtained from a paper book, the distinguishing module may divide the first-level units contained in it, as in the form of image recognition.

Optionally, the images of the first-level units in the target text, which is separated by recognition, are rearranged and presented in an arrangement in the present invention. The advantage is that one can only recognize the contours and edges of the first-level unit, and don't need to recognize the encoding in the first-level unit, saving the cost of computing and/or storage.

Optionally, one can process parts formed by separating level one unit of target text, such as image enhancement, grayscale adjustment, and so on. For example, in some cases, the text obtained by optical means may be unevenly distributed, such as overall grayscale, contrast, etc., through the above processing, one can improve the result of rearranging the present text.

Optionally, one can apply transition operation to inconsistent background patterns and/or brightness and/or colors at seams between flattened plural units, such as apply gradient effect operation.

Optionally, if the target text exists in a non-text encoding form, as in the form of graphics, for example, in the form of an electronic version of an image obtained from a paper book, the said distinguishing module may divide the first-level units contained in it, and recognize the content at the same time. For example, by means of image recognition, the edges and positions of the first-level units are divided at the same time as the text encoding is recognized.

Optionally, it is rearranged and rendered by dividing the first-level units in the recognized text code. However, the result represent is not the result of re-rendering the said code described, but rather images of each first-level unit split out of the original image. The advantage is that one can have flexibility in the way they are presented based on the information in the code, while maintaining the font, picture quality, and so on of the original image.

Optionally, one can process parts formed by separating level one unit of target text, such as image enhancement, grayscale adjustment, and so on. For example, in some cases, the text obtained by optical means may be unevenly distributed, such as overall grayscale, contrast, etc., through the above processing, one can improve the result of rearranging the present text in an non-traditional arrangement.

Optionally, one can apply transition operation to inconsistent background patterns and/or brightness and/or colors at seams between flattened plural units, such as apply gradient effect operation.

Optionally, one may specify specific parameters, such as line spacing, font, font size and so on according to the non-traditional arrangement of the present invention. It is arranged according to the parameters specified above. For example, the coordinates, sizes, and so on of the first units to be arranged can be calculated by the arranging module from the parameters mentioned above. Store these parameters in a data structure.

Optionally, the distinguishing module distinguishes target text can be based on the format of the target text, such as treat each character as each first-level unit, or base on the content of the target text, for example, recognize words, phrases, sense groups, phrases and so on by computer. Optionally, it can be implemented using algorithms in "natural language processing" (NLP) in the field of artificial intelligence. This implementation can be done by people in the field without the need for creative thinking.

It is important to note that the order of the above steps can be adjusted as needed.

When the processing of this method runs on the device that finally renders the result, it also includes a display module that presents the final result. Otherwise, if the processing of this method does not run on the device on which the result was finally rendered, for example, it is running on the server, the display step is not directly required.

It is important to note that the way of connection between the modules mentioned above can be adjusted as needed and is not limited to one of the connection methods shown in FIG. 44.

Fifteen:

The method of using a computer to achieve the non-traditional arrangement of the present invention includes the arrangement steps: forming first-level units into second-level units.

Optionally, if the system you are using does not store the target text in advance, get the target text first.

Optionally, the target text is stored in a text storage module(text storage data structure).

When the processing of this method runs on the device that finally renders the result, it also includes a display step that presents the final result. Otherwise, if the processing of this method does not run on the device on which the result was finally rendered, for example, it is running on the server, the display module is not directly required.

Optionally, the visual effects rendered are displayed by text encoding in each first-level unit, through text encoding fonts and display techniques in the system. The advantage is that it is flexible and diverse to produce the final rendering effect, based on the system's font, font size and other information and the characteristics of the module displaying text.

Optionally, display steps are implemented through a graphical user interface (GUI). The graphical user interface contains modules showing characters, graphics and images, which are used to display the target text in the way described in the present invention.

Optionally, one may specify specific parameters, such as line spacing, font, font size and so on according to the non-traditional arrangement of the present invention. It is arranged according to the parameters specified above. For example, the coordinates, sizes, and so on of the first units to be arranged can be calculated by the arranging module from the parameters mentioned above. Store these parameters in a data structure.

In some embodiment, optionally, the said functions are not fully implemented by the same device. Instead, they are achieved through communication between multiple devices. Similar to traditional web browsers, the server emits code for the content of a Web page. The content is graphically rendered and displayed by the client's browser. In this case, the system finishes the full function by multiple systems and/or devices. In this case, the transmission step is also included.

It is important to note that the order of the above steps can be adjusted as needed.

Sixteen:

FIG. 45 is a diagram of a device or system that implements the said non-traditional arrangement of the present invention, including an arrangement module, which builds second-level units from first-level units.

Optionally, if the system used does not store the target text in advance, it also includes a acquiring module that acquires that part of the target text before arranging it.

Optionally, also contains a text storage module, the said acquired target text is stored in the said text storage module (text storage data structure).

When the processing of this method runs on the device that finally renders the result, it also includes a display step that presents the final result. Otherwise, if the processing of this method does not run on the device on which the result was finally rendered, for example, it is running on the server, the display module is not directly required.

Optionally, the visual effects rendered are displayed by text encoding in each first-level unit, through text encoding fonts and display techniques in the system. The advantage is that it is flexible and diverse to produce the final rendering effect, based on the system's font, font size and other information and the characteristics of the module displaying text.

Optionally, display steps are implemented through a graphical user interface (GUI). The graphical user interface contains modules showing characters, graphics and images, which are used to display the target text in the way described in the present invention.

Optionally, one may specify specific parameters, such as line spacing, font, font size and so on according to the non-traditional arrangement of the present invention. It is arranged according to the parameters specified above. For example, the coordinates, sizes, and so on of the first units to be arranged can be calculated by the arranging module from the parameters mentioned above. Store these parameters in a data structure.

In some embodiment, optionally, the said functions are not fully implemented by the same device. Instead, they are achieved through communication between multiple devices. Similar to traditional web browsers, the server emits code for the content of a Web page. The content is graphically rendered and displayed by the client's browser. In this case, the system finishes the full function by multiple systems and/or devices. In this case, the transmission module is also included.

The connection in FIG. 45 represents a way in which a module is connected to another. It is important to note that the connection between the modules mentioned above can be adjusted as needed and is not limited to one shown in FIG. 45.

Seventeen:

FIG. 46 is a device or system that achieves the non-traditional arrangement of the present invention, including a storage module and a processing module. The wires in the figure represent a way in which a module is connected to another.

A storage module is used to store target text and store all necessary information during the operation of a device or system.

A processing module is used to coordinate, control other modules in the device or system. Optionally, it can be implemented by microcontrollers (MCUs), microprocessors.

Optionally, also includes a visual rendering module. Contains: display module, print module, used to render the specific display result of symbols.

Optionally, when it comes to user input, it involves the calculation of the location of the cursor. This task can be performed by part or all of the processing module. It can also include a positional calculation module, which is performed by a dedicate unit.

Optionally, includes input modules. The user input information is obtained through the input module. The said input module may contain the hardware and software interface of the input device, such as the usb interface, the driver of the keyboard, or the input device, such as the keyboard, hand writing tablet, mouse, microphone.

In some embodiment, optionally, the said functions are not fully implemented by the same device. Instead, they are achieved through communication between multiple devices. Similar to traditional web browsers, the server emits code for the content of a Web page. The content is graphically rendered and displayed by the client's browser. In this case, the system finishes the full function by multiple systems and/or devices. In this case, the transmission module is also included.

It is important to note that the connection between the modules mentioned above can be adjusted as needed and is not limited to one shown in FIG. 46.

Eighteen:

Methods for presenting the results of the input arranged in the non-traditional arrangement above to the final reader or editing the content that has been rendered in the non-traditional arrangement above, including the following steps:

Specify where to enter or edit in text or blank region that already exists. Optionally, the location can be indicated by the user's input or editing the indication mark. Optionally, it can be a flashing cursor when the results can be displayed dynamically by the displayed unit.

Optionally, the number of indication marks is plural.

Optionally, the identity contains multiple letters, symbols, or characters, such as traditional inverse selection.

Optionally, the user may freely move the indication marker, for example using an input device such as a keyboard keystroke and/or mouse to move and/or specify the location of the indication marker. When the indication marker is a cursor, optionally, it can be moved to the bottom of each editable character. The coordinates of these selectable locations can be calculated by the rendered front size of the symbols entered by the user, the shape of symbols and the non-traditional arrangements of the present invention used by the user. Apply one of the following operations at the specified location mentioned above: enter, insert, delete, copy, paste, cut, overwrite, and rewrite.

Optionally, in the process of enter or insertion or deletion or copying or pasting or cutting or overwriting or rewriting, according to the content of user input, paste, overwrite or rewrite the content is arranged in the non-traditional arrangement described in the present invention. The arrangement is a non-traditional arrangement method disclosed in the present invention. The arrangement may be a real-time arrangement, for example, after the user enters each first-level unit, the first-level unit is immediately moved to the position at which it should be put based on the first-level unit arrangement in the non-traditional arrangement in the present invention. Or, after the user has entered each second-level unit, the contents of the second-level unit are arranged in positions according to the non-traditional arrangement in the present invention, and the second-level units are arranged in positions in accordance with the non-traditional arrangement in the present invention. Each letter, character, or character entered by the user can be temporarily displayed to give feedback to the user during the unfinished process of the above input first- and/or second-level units. The said display process is to present the information in accordance with the embodiment described in the present invention. Optionally, the display can be done by calling corresponding components in the graphical user interface (GUI) base on the code the user input. The said arrangement can be a time-lapse arrangement, for example, after the user enter each first-level unit and meet certain conditions, the first-level unit is immediately moved to the position in accordance with the non-traditional arrangement in the present invention where the first-level unit should be. Or, after the user enters each second-level unit and meet certain conditions, the contents of the second-level unit shall be arranged in position in accordance with the non-traditional arrangement in the present invention, and the second-level units shall be arranged in position in accordance with the non-traditional arrangement in the present invention. Each letter, character, or character entered by the user can be temporarily displayed to give feedback to the user during the unfinished input first- and/or second-level units process mentioned above. The said certain conditions that are satisfied can be temporal conditions such as delay for a certain period of time. It can also be triggering according to conditions such as what the user enters, for example, when the user enters a second second-level unit, the system can detect the end position of the first second-level unit entered by the user, so that the first second-level unit can be arranged. It can also be a time for the user to take the initiative to control it. It can also be triggered when the user saves the entire file. It can also be triggered when the user sends it. The said display process is to present the information in accordance with the embodiment described in the present invention. Optionally, the display can be done by calling corresponding components in the graphical user interface (GUI) base on the code the user input.

It is important to note that when transmitting information between multiple devices, for example, in applications such as communication between multiple mobile devices through instant chat software or between servers and clients, it is not necessarily required that all of the above steps be completed by the devices used for input or editing, as long as these steps are completed as a whole by sending or receiving devices used by the user to enter or edit the information. For example, in one case, the sender who inputs and edits merely saves the input text, and the parameters of the non-traditional arrangement of the present invention are transmitted to the receiver, or the receiver is explicitly notified or in accordance with the default parameters to display the information sent by the sender. Taking a smartphone information input method as an example, FIG. 47 shows an interface that can implement the embodiment of the input method of smartphone in the present invention. In this way, the input user can display the text information he or she enters only in the traditional arrangement (FIG. 47a). The receiver can display the contents received by the instant chat software in accordance with the non-traditional arrangement of the present invention (FIG. 47b).

The input methods can comprise handwriting, keyboard, voice and other input methods.

Optionally, it can contain single display region to display the input and/or final arrangement results in the traditionally rendering way. It can also contain plural display regions that display the input and/or final arrangement results in the traditionally rendering way. When the number of display region is single, the user may conveniently switch between rendering in a traditional manner and rendering in the final arrangement of the results described in the present invention, for example, using a keyboard, a key on the mouse or a shortcut key or a key on a graphical interface. When the number of display regions is plural, where the first display region always displays the target text in the traditional way, the contents rendered in the manner described in the present invention described above in the steps are presented in one or more regions other than the first display region.

Optionally, the said user interface does not have to occupy the entire display device, such as the screen. Optionally, it also contains steps to generate the results of the final rendering in a non-text format, such as a picture format. In some cases, users can generate pictures, pdfs, and other formats with the result of the final rendering. So that, in the process of dissemination, even if the reader lacks software that can render the text information in the non-traditional arrangement described in the present invention, she can also read pictures of the text rendered in the non-traditional arrangement described in the present invention.

Nineteen:

FIG. 48 shows a device or system that presents the input in the said non-traditional arrangement to the final reader or edits the content input which has been rendered in the said non-traditional arrangement. It contains the following modules: display modules (which can contain the user's graphical interface GUI).

Optionally, the display module contains an input or edit region that allows the user to specify the location of the input or edit in the region of text or blank that already exists in that region. Optionally, the location can be indicated by the indication mark at the position of the user's input or edit. Optionally, it can be a flashing cursor when the results can be displayed dynamically by the displayed unit. Optionally, the number of indication marks is plural. Optionally, the identification mark comprise multiple letters, symbols, or characters, such as traditional inverse selection. Optionally, the user may freely move the indication mark, for example using an input device such as a keyboard keystroke and/or mouse to move and/or specify the location of the indication mark. When the indication mark is a cursor, optionally, it can be moved to the position which is below each editable symbol. The coordinates of these selectable positions can be calculated by the size of the symbols rendered, shape of symbols entered by the user, and the non-traditional arrangement of the present invention adopted by the user.

The display module also includes one or multiple following functions: enter, insert, delete, copy, paste, cut, overwrite and rewrite in the specified location mentioned above. The input method can comprise handwriting, keyboard, voice and other input methods.

Optionally, it also comprise arrangement module. In the process of enter or insertion or deletion or copying or pasting or cutting or overwriting or rewriting, according to the content of user input, paste, overwrite or rewrite the content is arranged in the non-traditional arrangement described in the present invention. The arrangement is a non-traditional arrangement method disclosed in the present invention. The arrangement may be a real-time arrangement, for example, after the user enters each first-level unit, the first-level unit is immediately moved to the position at which it should be put based on the first-level unit arrangement in the non-traditional arrangement in the present invention. Or, after the user has entered each second-level unit, the contents of the second-level unit are arranged in positions according to the non-traditional arrangement in the present invention, and the second-level units are arranged in positions in accordance with the non-traditional arrangement in the present invention. Each letter, character, or character entered by the user can be temporarily displayed to give feedback to the user during the unfinished process of the above input first- and/or second-level units. The said display process is to present the information in accordance with the embodiment described in the present invention. Optionally, the display can be done by calling corresponding components in the graphical user interface (GUI) base on the code the user input.

The said arrangement can be a time-lapse arrangement, for example, after the user enter each first-level unit and meet certain conditions, the first-level unit is immediately moved to the position in accordance with the non-traditional arrangement in the present invention where the first-level unit should be. Or, after the user enters each second-level unit and meet certain conditions, the contents of the second-level unit shall be arranged in position in accordance with the non-traditional arrangement in the present invention, and the second-level units shall be arranged in position in accordance with the non-traditional arrangement in the present invention. Each letter, character, or character entered by the user can be temporarily displayed to give feedback to the user during the unfinished input first- and/or second-level units process mentioned above. The said certain conditions that are satisfied can be temporal conditions such as delay for a certain period of time. It can also be triggering according to conditions such as what the user enters, for example, when the user enters a second second-level unit, the system can detect the end position of the first second-level unit entered by the user, so that the first second-level unit can be arranged. It can also be a time for the user to take the initiative to control it. It can also be triggered when the user saves the entire file. It can also be triggered when the user sends it. The said display process is to present the information in accordance with the embodiment described in the present invention. Optionally, the display can be done by calling corresponding components in the graphical user interface (GUI) base on the code the user input.

It is important to note that when transmitting information between multiple devices in the embodiment described in this invention, for example, in applications such as communication between multiple mobile devices through instant chat software or between servers and clients, it is not necessarily required that all of the above steps be completed by the devices used for input or editing, as long as these steps are completed as a whole by sending or receiving devices used by the user to enter or edit the information. For example, optionally, it contains transmission module, used to transmit information between different devices. In one case, the sender who inputs and edits merely saves the input text, and the parameters of the non-traditional arrangement of the present invention are transmitted to the receiver, or the receiver is explicitly notified or in accordance with the default parameters to display the information sent by the sender. Taking a smartphone information input method as an example, FIG. 47 shows an interface that can implement the embodiment of the input method of smartphone in the present invention. In this way, the input user can display the text information he or she enters only in the traditional arrangement (FIG. 47a). The receiver can display the contents received by the instant chat software in accordance with the non-traditional arrangement of the present invention (FIG. 47b).

Optionally, it contains storage module. For example, the storage module can be (text storage data structure). It can save target text. Optionally, it also contains steps to generate the results of the final rendering in a non-text format, such as a picture format. In some cases, users can generate pictures, pdfs, and other formats with the result of the final rendering. So that, in the process of dissemination, even if the reader lacks software that can render the text information in the non-traditional arrangement described in the present invention, she can also read pictures of the text rendered in the non-traditional arrangement described in the present invention. The display module handles generating pictures, pdfs and other formats of the final rendering results. It is important to note that the way of connection between the modules mentioned above can be adjusted as needed and is not limited to the one shown in FIG. 48.

The Advantage of the Invention Include

Some academic ideas suggest that humans understand the meaning of an entire sentence by logically separating different words, phrases, groups of meanings, etc. in the process of reading text materials and understanding them. For languages, such as Chinese, in which usually there is no natural interval between words, human beings in reading also need to use brain to carry out words, phrases, sentence composition, sentences and other different levels of analysis to understand the meaning of sentences. In this sense, the beneficial effect of the present invention, in addition to making full use of the human eye's field of vision, also includes reducing the processing cost to pre-divide words, phrases or sense groups and presented in an easy-to-recognize manner, thereby improving the efficiency of reading and understanding.

The invention can make full use of receptors, such as the vision of the human eye, to obtain the contents with close relation in context at the same time or adjacent time. And, it avoids the case in which one obtains the context of the often not closely connected to each other in the traditional arrangement of the field of view, that is, for example, in the traditional lateral arrangement of text and other materials, the field of view can cover different lines of content at the same time.

Some of the embodiment contained in the present invention can make the receptor acquire the same word, phrase, sense group and other components at once, thus improving the efficiency of understanding in reading.

Some of the embodiment included in the present invention may enable receptors such as the human eye to obtain more information than the traditional arrangement method, and therefore can reduce the number of times of the longitudinal motion receptors move back and forth when obtaining the same information.

The second-level unit in the embodiment contained in the present invention contains first-level units arranged along multiple lines. Therefore, for cases in which the second-level units are arranged laterally, the "height" of the second-level unit is higher than the height of the words arranged in the traditional way. This in itself reduces the occurrence of "wrong line" errors in traditional arrangements.

The embodiment contained in the present invention includes some cases that enable the reader to overcome the habits of "lip reading" and/or "silent reading". Some academic opinions suggest that when people read text, "lip reading", which simulates pronunciation by the movement of the lips while reading, can have a negative effect on the efficiency of reading. The scheme contained in the invention can overcome this phenomenon to a great extent.

Experimental verification, the present invention contains several typical embodiment have been verified by the experiment. A total of 31 persons of different genders, aged 10 to 58, were the subjects. Their education level is from the sixth grade of primary school to the doctor's degree. The language is all Chinese as the mother tongue. Of these, 28 have mastered English to varying degrees, from entry to proficiency. Three of them are Spanish, Japanese and Korean. Subjects read the contents of the technical scheme presented by the same difficulty, which are presented in the same article in a traditional way and contained in the present invention, respectively. In terms of reading speed, the content presented by the technical scheme contained in the present invention is improved by 8% to 92% compared with the content presented in the traditional way. Subjects subjective feelings, compared with the traditional way of presenting the content, the present invention contains the technical scheme to present the content will cause more minor eye fatigue. The subject's observational analysis of the subjects found that the subjects (9) who had lip-reading when reading the traditionally rendered text material avoided lip-reading when reading the content presented in the technical scheme contained in the present invention.

Definitions of Some of the Terms

The term "gaze" in this paper refers to the optically felt organ or device, such as the human eye's short focus on a target to obtain information.

The region of display or display region is an region of the display device that can be used to display graphics, images, text, symbols, spaces, objects, etc. In some cases, for the sake of reading adaptability, the region is not the entire display region of the device, such as the headers, footers, and blank edges when printing graphics, images, text, symbols, spaces, or objects on paper. Display devices here include, but are not limited to, paper, prints, displays, VR displays, stereo displays, projectors.

The receptors described in this article refer to organs or devices of optical sensing, such as human eyes, camera devices, etc. to obtain influences, optical signals or organs.

The "curves" in this article are curves in a broad sense and comprises straight lines, lines, sleek arcs (that is, conductive everywhere), intermittent lines, and irregular line lights.

The "ellipse" in this article is an ellipse in a broad sense and comprises a circle.

Non-traditional arrangement. In this article, it means any forms of graphics, images, text, symbols, spaces or objects disclosed in the present invention that are different to the traditional arrangement, to show a distinction. It can comprise multiple embodiment.

"Text" in this article refers to graphics, images, text, symbols, spaces, or objects where possible and without logical confusion. When used in different language types, you can refer to the kind of language.

The complete embodiment in this article can comprise the selection of the first-level units, the way of the first-level unit arrangement, the selection of the second-level units, the way of the second-level unit arrangement and other aspects of the embodiment formed by any combination of different embodiment.

It is worth noting that for the segments of different natural passages in an article, different forms of marks in the present invention can be adopted to achieve. For example, one can indicate the beginning of a natural passage by indentation at the beginning of a second-level unit. It can also be marked with changes in other symbols, and/or font sizes, fonts, and so on.

It is worth noting that some theories and opinions involved in this paper are only used as explanations for the technical effects of the embodiment of the present invention. Whether the theory and viewpoint itself is correct or not and whether it is accurate or not does not in itself affect the effect and effectiveness of the embodiment of the present invention.

It is worth noting that some of the ways defining specific components of language and text involved in this article, such as sense groups, words, phrases, etc., might not be the same with the mainstream academic views, or even not necessarily be correct or accurate. This is only a demonstration of the embodiment comprised in the present invention. This difference does not affect the effect and effectiveness of the embodiment of the present invention.

It is important to note that additional graphics, images, text, symbols, spaces, or objects can be added to the second-level unit to assist. It is worth noting that skilled personnel in this field can naturally apply the present invention to various languages, not be limited to the languages recorded in this article. For some languages, the special grammatical phenomenon can be in accordance with the general correspondence and equivalent correspondence to the present invention revealed in the embodiment, so it is natural to extend the embodiment in the present invention to a wider range of languages, and this goal can be achieved by skilled personnel in the field easily.

It is worth noting that the "reading" referred to in the present invention is not limited to humans, but should also include intelligent machines, robots, computers and other systems. That is, the "reading" represented by the present invention is a broad reading. When a machine, robot, computer and other systems can obtain graphics, images, text, symbols, spaces or objects, such as recognition and storage, the "reading" as defined in the present invention also includes reading such graphics, images, text, symbols, spaces or objects, such as recognition and storage. Therefore, the object of the present invention is not limited to humans. The sensory device contained in the present invention, in addition to the human vision system, also comprises the visual acquisition devices in machines, robots, computer systems, etc.

Different languages have different names or terms for units that make up of multiple words that can be expressed independently, for example, in English, some structures consisting of verbs and other words such as prepositions are called "phrase verbs". Structures corresponding to Chinese, for example, are often referred to as "phrases". Therefore, the use of "phrases" in this paper represents the structures composed of multiple words in various languages, that is, "phrases" comprise the corresponding structures in various languages.

It is worth noting that due to the natural characteristics of language text, there can be some phenomena doesn't follow grammar or language rules in some kinds of languages and texts, and these exceptions are also part of the embodiment contained in the present invention.

It is worth noting that when the text content is technical text content, the use of some formulas, tables, special symbols can retain the traditional arrangement of the way, they can also use the way contained in the embodiment of the non-traditional arrangement the present invention contains.

The direction and orientation mentioned in the present invention: longitudinal, lateral, top and bottom refer to graphics, images, text, symbols, spaces or objects, etc. Take the direction rendered during reading for reference.

The computers mentioned in this article include, but are not limited to, traditional personal computers, servers, embedded systems, microcomputers, microcontrollers, microcontrollers, digital signal processors, artificial neural network chips, tablets, mobile phones, smart appliances, wearable devices, quantum computers.

The scope of the present invention includes a scheme formed naturally by ordinary technicians in the present field by replacing it with other devices with the same function.

The invention claimed is:

1. A method of arranging text, symbols, spaces or objects, comprising the steps of:
   forming at least one first-level unit by including any of the following or any combination thereof: letters, characters, Japanese hiraganas, Japanese katakanas, syllables, punctuation marks, spaces, gene fragments in gene sequences;
   distinguishing at least one first-level unit of a target text through sentence components of the target text;
   forming at least one second-level unit by including the at least one first-level unit, each of the at least one second-level unit covering any of the following or any combination thereof:
   words, phrases, sense groups, parts formed by punctuation segmentation, sentences, a group of punctuation marks that are gathered together in one original order, sentence components, genes in gene sequences, variable names of programing languages, keywords of programing languages, statements on individual lines of programing languages, parts enclosed in parentheses of programing languages, classes of programing languages, methods of programing languages;
   wherein the at least one second-level unit is identifiable by a gaze;
   wherein when one of the at least one second-level unit comprises multiple first-level units, the multiple first-level units are arranged in accordance with their original order, either on a single curve or line or on plural curves or lines;
   wherein when the at least one second-level unit comprises multiple first-level units that are arranged in accordance with their original order and on plural lines, an arrangement orientation of the multiple first-level units is in any direction;
   wherein the at least one first-level unit comprises base symbols, or a part of the variable names, the keywords, the statements on individual lines, the parts enclosed in parentheses, the classes or methods of the programing languages; and
   wherein the genes are sequenced by a gene sequencing instrument based on the at least one first-level unit comprising the base symbols and the at least one second-level unit comprising the genes in the gene sequences.

2. The method of claim 1, wherein the at least one second-level unit comprises only one of the at least one first-level unit.

3. The method of claim 1, wherein the arrangement orientation of the multiple first-level units is from top to bottom, bottom to top, or a combination thereof.

4. The method of claim 3, wherein the specific arrangement is as follows: for the contents of at least one second-level units of the target, in accordance with the original order of the text arranged in a straight line, numbering the first-level units from 1 to n, where n is the total number of text symbol and/or characters and/or punctuation and/or spaces in the second-level unit; estimating the total number of arrangement lines or curves is k, mark all of the lines and curves from 1, 2, 3 . . . k, called a row number; arranging the first-level units in order on the curve or straight line in order from 1 to k; rearranging the first-level units in order from 1 to k on the curve or straight line until all arranged.

5. The method of claim 1, wherein according to a location on the curves or straight lines or a content of the one of the at least one second-level unit, including characters, letters, syllables, words, phrases, sense groups, the content of the one of the at least one second-level unit has different font sizes, fonts, patterns, orientations, colors, blurriness and other appearance differences.

6. The method of claim 1, wherein the step of forming the at least one first-level unit or the second-level unit is completed by an algorithm in natural language processing field.

7. The method of claim 1, wherein the method further comprises the following steps:
   101) arranging the at least one first-level unit to form at least one second-level unit in a non-traditional arrangement; and
   102) rendering the at least one first-level unit and the at least one second-level units in the display domain.

8. The method of claim 7, wherein the method further comprises the following step: specifying a location of input or edit in the target text or a blank region that already exists.

9. The method of claim 1, wherein when the at least one second-level unit comprises multiple second-level units, the multiple second-level units are arranged laterally, and wherein when a height of one of the multiple second-level units is different from a height of another of the multiple second-level units, centers of the one and the another of the multiple second-level units are aligned in the same lateral direction.

10. The method of claim 1, wherein there are interval markers in between the multiple first-level units.

11. The method of claim 1, wherein the arrangement orientation is first from top left to bottom right.

12. The method of claim 1, wherein when there are multiple second-level units, an arrangement orientation of the multiple second-level units is lateral, longitudinal, or a combination of lateral and longitudinal.

13. The method of claim 1, wherein the multiple first-level units are arranged along different plural curves or lines.

14. The method of claim 1, wherein the arrangement orientation of the multiple first-level units is in a lateral direction first and then in a longitudinal direction.

15. The method of claim 1, wherein the curve is elliptical on the whole as the shape of the human eye's field of view.

16. The method of claim 1, wherein the method is done dynamically.

17. A device or system converting a traditional arrangement of text, symbols, spaces or objects into a non-traditional arrangement method with at least one first-level unit and at least one second-level unit, comprising:

a distinguish module configured to distinguish the at least one first-level unit from a target text through sentence components of the target text, wherein the at least one first-level unit including any of the following or any combination thereof: letters, characters, Japanese hiraganas, Japanese katakanas, syllables, punctuation mark, spaces, gene fragments in gene sequences; and an arrangement module configured to turn the at least one first-level unit into the at least one second-level unit by covering any of the following or any combination thereof: words, phrases, sense groups, parts formed by punctuation segmentation, sentences, a group of punctuation marks that are gathered together in one original order, sentence components, genes in gene sequences, variable names of programing languages, keywords of programing languages, statements on individual lines of programing languages, parts enclosed in parentheses of programing languages, classes of programing languages, methods of programing languages;

wherein the at least one second-level unit is identifiable by a gaze;

wherein when one of the at least one second-level unit comprises multiple first-level units, the multiple first-level units are arranged in accordance with their original order, either on a single curve or line or on plural curves or lines;

wherein when the at least one second-level unit comprises multiple first-level units that are arranged in accordance with their original order and on plural lines, an arrangement orientation of the multiple first-level units is in any direction;

wherein the at least one first-level unit comprises base symbols, or a part of the variable names, the keywords, the statements on individual lines, the parts enclosed in parentheses, the classes or methods of the programing languages; and wherein the genes are sequenced by a gene sequencing instrument based on the at least one first-level unit comprising the base symbols and the at least one second-level unit comprising the genes in the gene sequences.

18. The device or system of claim 17, further comprising an acquiring module configured to get target text first.

19. The device or system of claim 17, further comprising a storage module configured to store the target text and the necessary information in the course of the operation of the device or system, and a processing module configured to coordinate with and control the work of other modules in the system.

20. The device or system of claim 19, further comprising a user input unit configured to calculate the position of the cursor by part or all of the processing module, or a positional calculation module, achieving by a separate device.

21. The device or system of claim 20, wherein after the user enters each of the at least one first-level unit by the user input unit and which meets the set condition, the first-level unit is immediately moved to the position where it should be put based on the first-level unit arrangement in the non-traditional arrangement.

*    *    *    *    *